United States Patent [19]

Leconte et al.

[11] 4,306,218

[45] Dec. 15, 1981

[54] CONTROL DEVICE FOR AUTOMOBILE ELECTRIC EQUIPMENTS

[75] Inventors: Gilles Leconte, Paris; Michel Pelloille, Maisons-Alfort, both of France

[73] Assignee: Regie Nationale des Usines Renault, Boulogne Billancourt, France

[21] Appl. No.: 843,441

[22] Filed: Oct. 19, 1977

[30] Foreign Application Priority Data

Oct. 28, 1976 [FR] France .................................. 76 32563
Mar. 29, 1977 [FR] France .................................. 77 09285

[51] Int. Cl.³ .............................................. B60Q 1/00
[52] U.S. Cl. .......................................... 340/66; 340/67; 340/74; 340/81 R; 340/56; 307/10 LS; 364/424
[58] Field of Search ...................... 340/66, 67, 72, 73, 340/74, 81 R, 52 F, 56; 180/82 R; 364/424, 426; 116/35 R, 36; 11/11; 307/10 LS, 10 R; 315/77, 82

[56] References Cited

U.S. PATENT DOCUMENTS

| 3,651,454 | 3/1972 | Venema et al. .................. 340/52 F |
| 3,864,578 | 2/1975 | Lackey ............................. 340/52 F |
| 4,058,796 | 11/1977 | Oishi et al. ...................... 340/52 F |
| 4,058,797 | 11/1977 | Sekiguchi et al. .................... 340/73 |

*Primary Examiner*—Thomas A. Robinson
*Assistant Examiner*—Donnie L. Crosland
*Attorney, Agent, or Firm*—Fleit & Jacobson

[57] ABSTRACT

A device for controlling components of electrical equipment of a motor vehicle, such as flashing direction indicators, warning lights, side and rear lamps, etc. Respective control switches actuable by the driver of the vehicle, control circuit units for processing control signals from the control switches, control relays activated by the control circuit units to supply the components, and a synthesis circuit common to all of the control circuit units and providing a common supply output for all the control circuit units are provided. The synthesis circuit has a prepositioning circuit providing a prepositioning output, and a general clock adapted to serve as a time base for the system by controlling an input shifting circuit, in each control circuit unit, to shift a transient control signal such that it is provided at the output of the input shifting circuit when its duration is of at least one clock period. Each control circuit unit also has a memorizing circuit responsive to the prepositioning output for memorizing the control signal provided at the output of the input shifting circuit.

43 Claims, 38 Drawing Figures

FIG._1

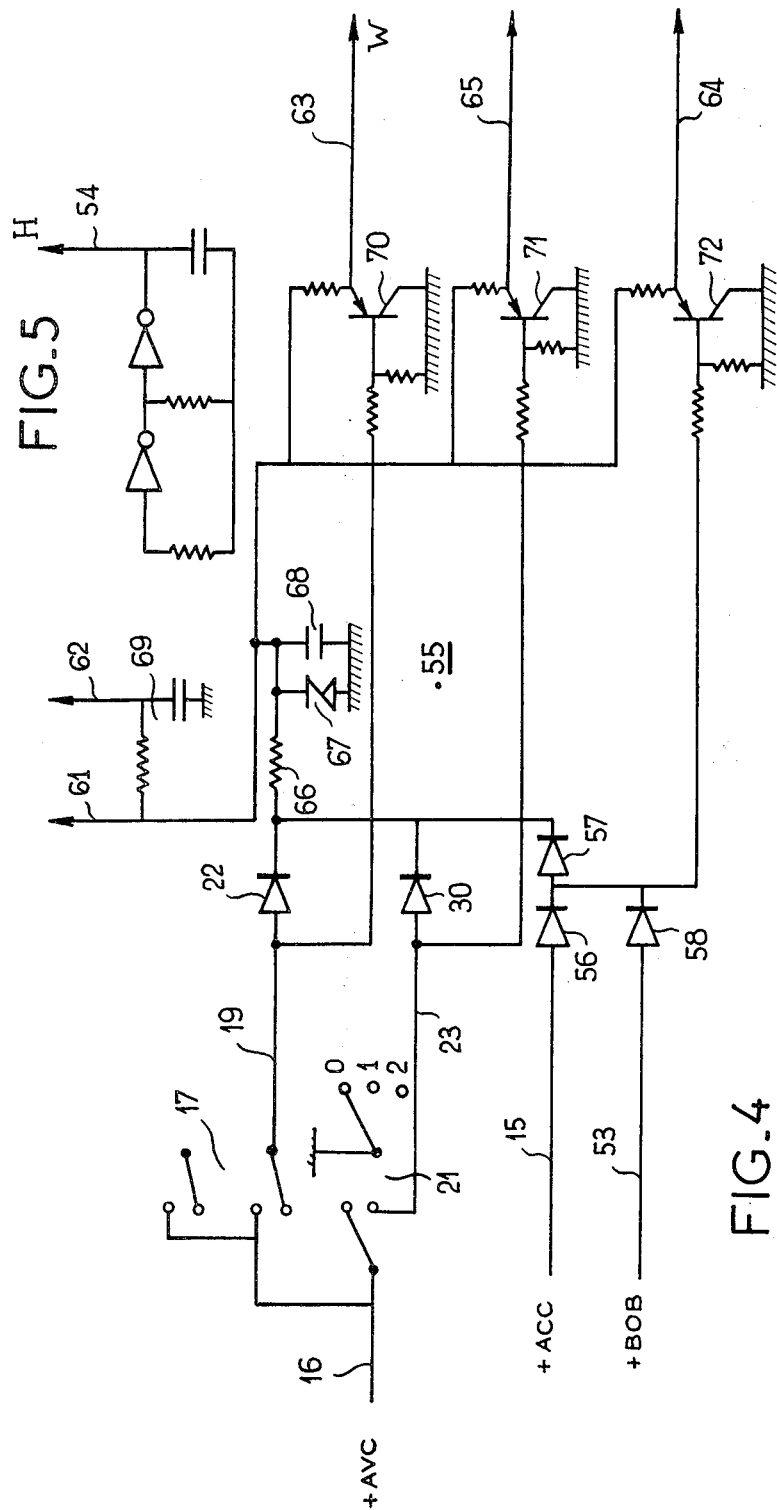

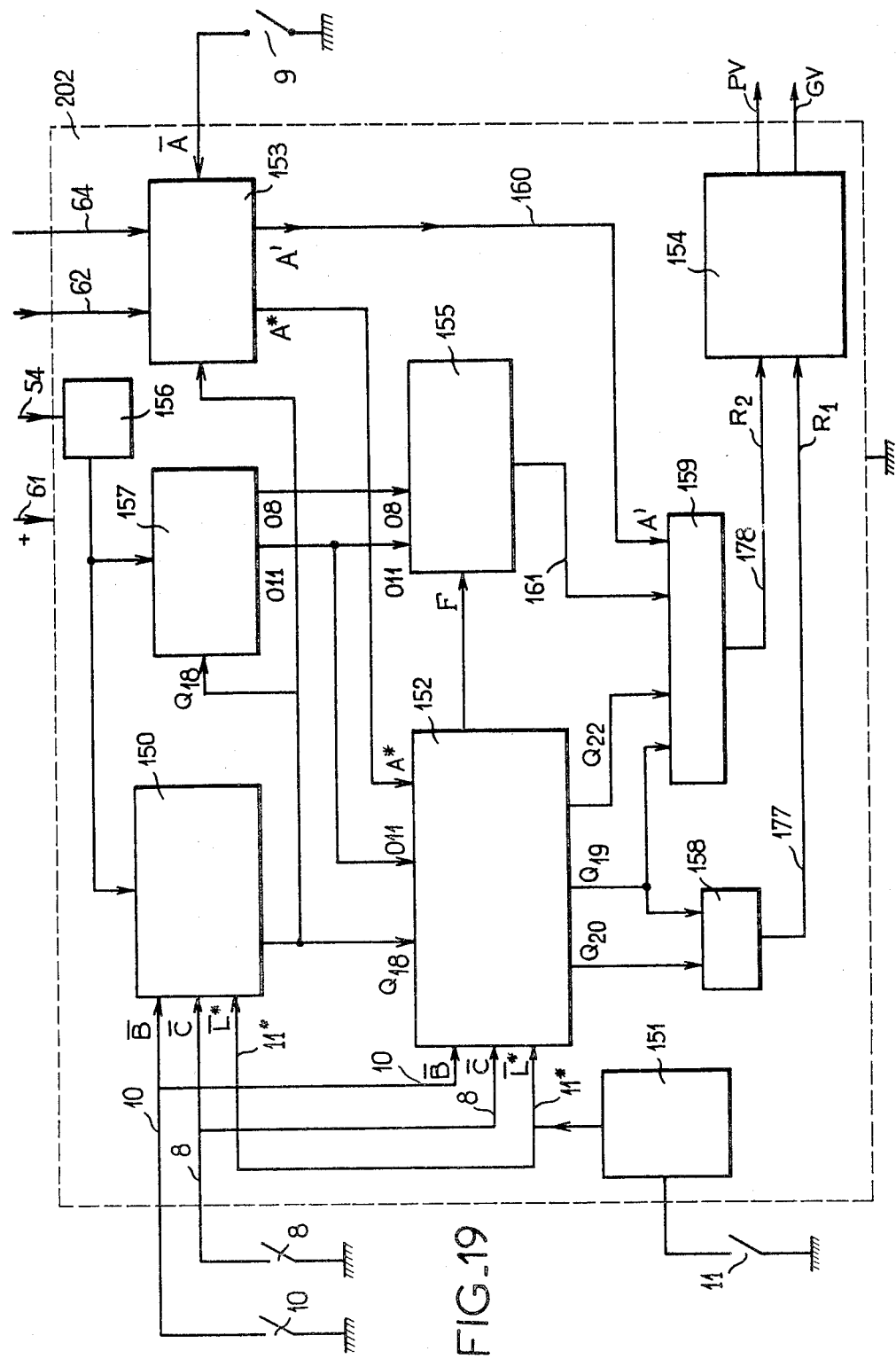
FIG_19

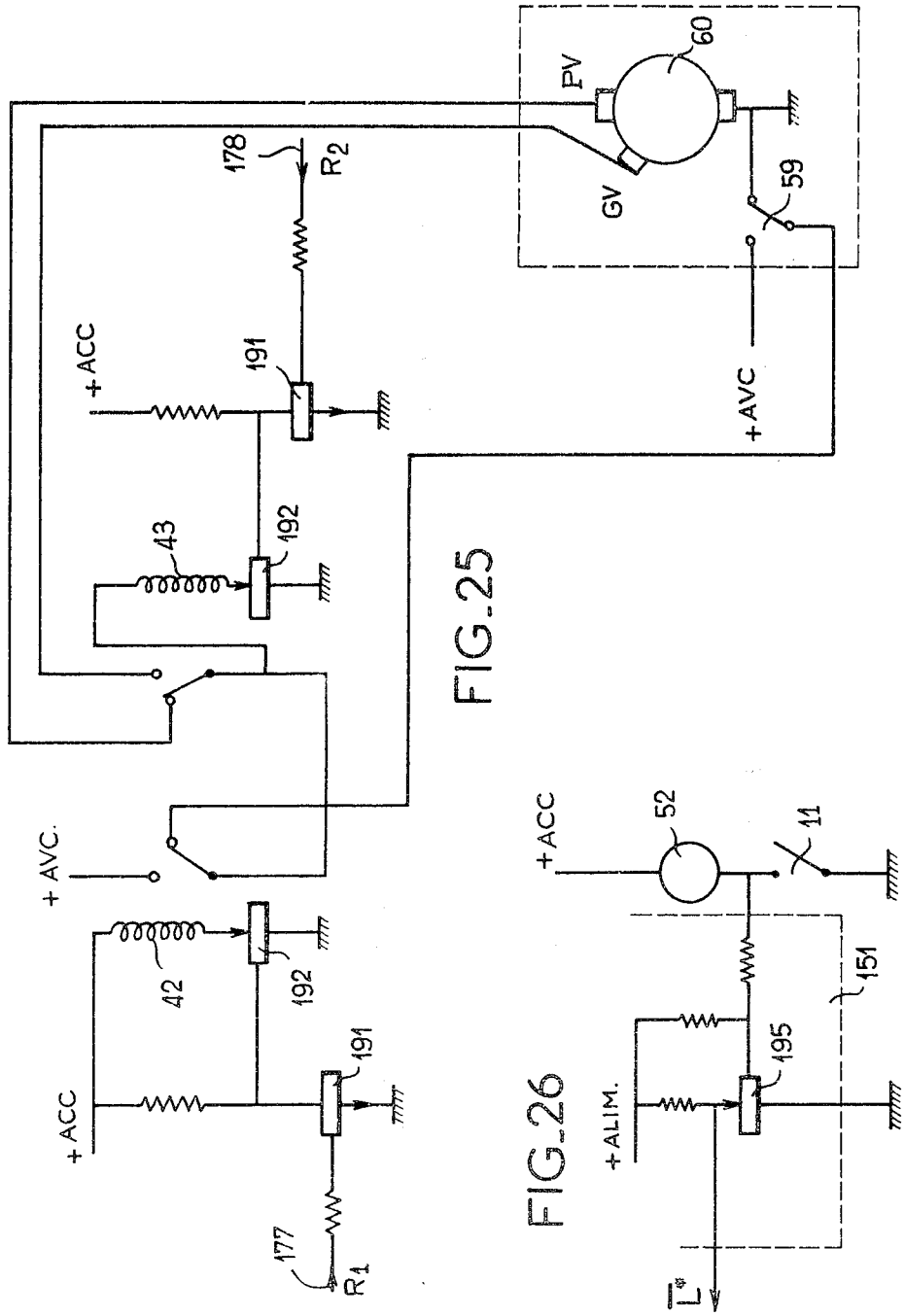

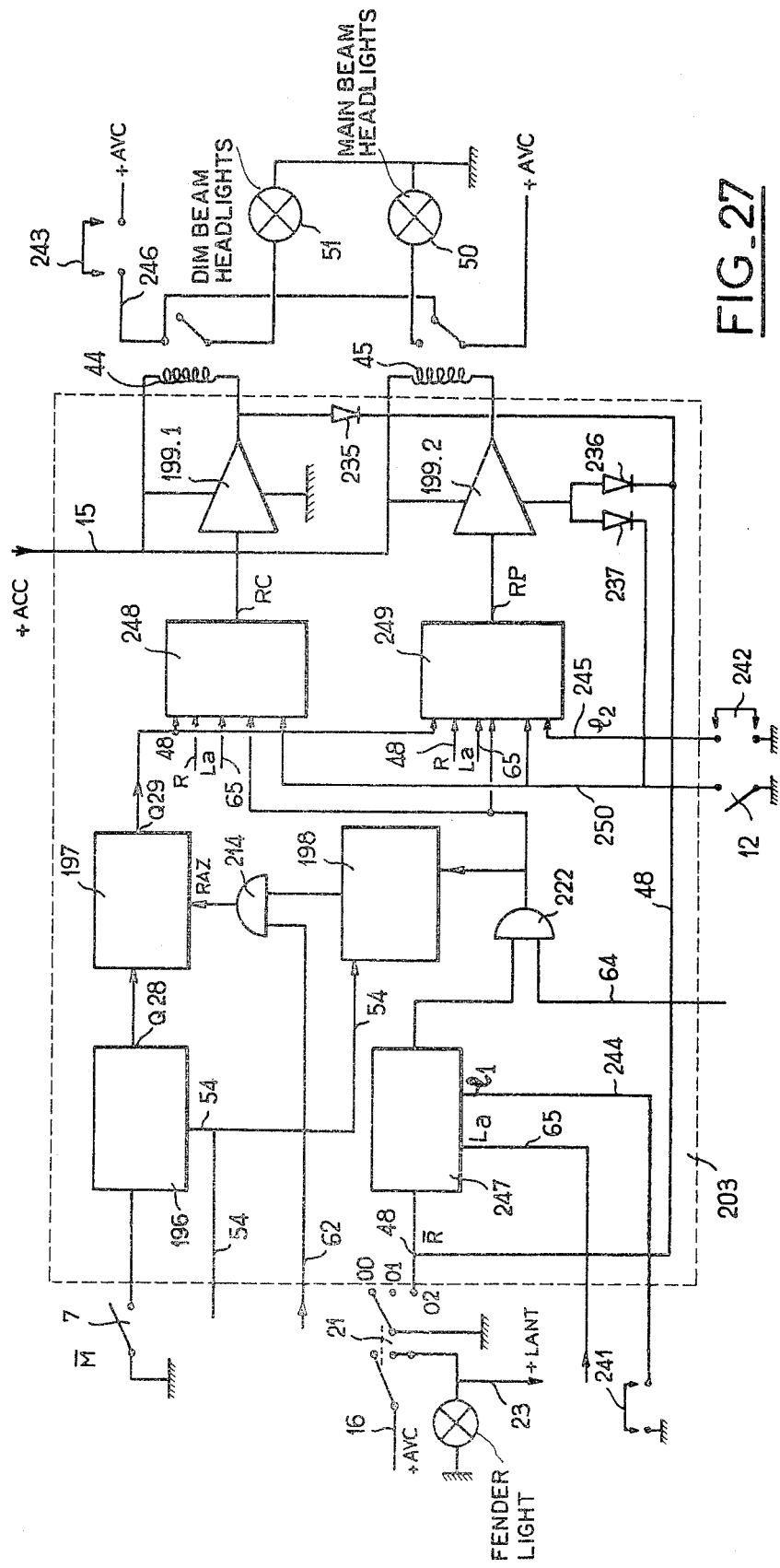
FIG_27

CONTROL DEVICE FOR AUTOMOBILE ELECTRIC EQUIPMENTS

The present invention relates in general to means for controlling the electrical equipment of an automotive vehicle, and more particularly to a device for the transient control of this equipment, more specifically the external light sources of the vehicle.

When driving an automotive vehicle the actuation of multiple controls concerning for example directional indicators or flashers, headlights, windshield wipers, windshield electric washers, etc . . . , requires a certain skill on account of the locations of said control, and this may therefore prove hazardous to the driver and to the occupants of on-coming vehicles.

According to the present invention, these multiple controls are disposed in close vicinity of the steering wheel.

The actuation of these controls, consisting essentially of finger-tip touch, short-stroke switches requires only a very light movement. These switches can be operated by simply applying the tip of a finger on corresponding keys, and therefore this can be done by the driver while he continues to hold the steering wheel with both hands. Moreover, transient switches are grounded when closed so that it is unnecessary to return any wire to the mounting plate, and the signal processing section, the relay control section and the relays themselves can be assembled at a same centralized location, thus simplifying the wiring.

According to a characteristic feature of this invention, the device for controlling the electrical equipment of a motor vehicle which comprises notably the directional flashers, indicators, dimmed-beam and mainbeam headlights, windshield wipers, windshield washer (without considering this list as an exhaustive one) comprises short-stroke transient switches grounded in their closed position, wherein all the control members such as finger-tip keys or the like are located in closed proximity of the steering wheel so that they can be actuated holding and rotating the steering wheel under normal driving conditions, is characterized in that the logic circuits controlling the various steady and transient conditions are assembled into a single computer disposed between the transient switches and the power members, and that this single computer comprises notably: the general clock, of the non-triggered type, of the device; a current supply generator; a pre-positioning circuit; an inhibition signal generating circuit constituting a so-called synthesis circuit controlling the operation of the signal-processing central unit or units pertaining more particularly to function groups connected to predetermined apparatus of the vehicle, such as for instance directional indicators (flashers), windshield wipers or the lighting system.

Advantageously, said synthesis circuit has its inputs connected on the one hand to a two-way warning switch and on the other hand to a general three-way lighting switch adapted to receive and select various fixed reference voltages; its comprises six main outputs delivering a regulated supply voltage, one clock output, one pre-positioning voltage, a warning order, first and second inhibition voltages, an OR-function logic circuit disposed between the inputs and outputs and so arranged that a given position of the control member of the main lighting switch will positively present the memorization of information in certain signal processing central units.

According to a typical feature characterizing the practical embodiment of the instant invention, inversion relays are provided for controlling the switching of headlights from their bright condition to their dimmed condition and vice versa, whereas the side lamp and pump control devices are connected directly to the power members.

According to a specific form of embodiment, the mounting plate comprises a synthesis circuit, a flasher unit for the direction indicators, a windshield-wiper central unit and a lighting central unit constituting a computer fully synchronized by a single, permanently beating clock; it also comprises the power members, namely the relays in the present form of embodiment.

According to a characteristic form of embodiment, the signals from the computer are selected by protection circuits to eliminate contact rattling, crackling, and other stray noises, the circuits incorporating shift registers.

According to a further feature characterizing this invention, a current detection circuit incorporating a REED relay fitted to the mounting plate is provided for detecting the non-operation of a directional signal lamp.

Advantageously, the flashing direction indicators are stopped or turned off automatically under the control of a return device associated on the one hand with pick-up means detecting the reversal of the direction of rotation of the steering wheel and on the other hand with a distance-responsive pick-up.

According to a particularly advantageous feature characterizing this invention, directional flashers and windshield wipers are stopped by priority. In case a control were grounded permanently, for example as a consequence of a jammed control key, the corresponding function can be stopped by simply depressing the stop key.

According to a more definite form embodiment, the OR-function logic circuit disposed between the inputs and outputs of the synthesis circuit is a diode logic circuit providing the function: "+warning OR +accessories OR +side lamps OR +coils". If one of these four "plus" supplies current to the synthesis circuit, the supply voltage for the subsequent logic circuits is obtained in the output conductor or wire delivering a regulated supply voltage. Moreover, it is possible to cause the inhibition of the various circuits through the output conductors or wires in which an inhibition voltage flows. Thus, information can be stored or memorized in the flashers, windhield-wiper and lighting circuits if the synthesis circuit is energized from the "+accessories" or "+coil" terminals.

Advantageously, when the voltage is applied, the proper pre-positioning of all logic circuits is obtained by means of an RC integrator common to the three central units constituting the computer.

According to a specific feature characterizing one form of embodiment of the invention, each signal processing central unit comprises at least one or a plurality of input circuits synchronized by the permanently beating clock of the control device and connected either directly or through the medium of logic gates to the control transient switches connected in turn to the central unit concerned; a stop or inhibition and pre-positioning circuit, a state memorizing circuit of which the complexity depends on the number of signals to be memorized; a set of intermediate logic gates capable of establishing the proper connections between the various circuits and an output interface connected to the coils of the relays for energizing the final members to be either illuminated or started for motion.

In the case of the direction indicator flasher central unit, the latter further comprises: a circuit capable of detecting the intensity of the current flowing through the lamps; an automatic return circuit; a reset circuit and a set of logic gates capable of combining the signals from these various circuits through the medium of a clock signal frequency divider in order to transmit the necessary data to the set of logic gates.

In the specific case of the direction indicator flasher unit, the latter further comprises an input circuit connected to the wire transmitting the "warning" order from the synthesis circuit having its output connected to said set of logic gates.

According to a characteristic form of embodiment, the input circuits consist each of the cascade connection of a pair of flip-flops or multivibrators the operation of which is synchronized by the permanent clock of the device.

According to this invention, the system for memorizing the data concerning the flashers is so arranged that it incorporates a reset or zeroing signal generating circuit in the form of a logic gate expressing:

$$RAZ = \overline{Y} = NOR \text{ flasher NOR warning}$$

which has a high potential when the system is inoperative and resumes the high-potential value during a clock period in the course of a right⇌left inversion. This signal permits or resetting the return circuit, the current-detecting circuit and more particularly the frequency divider associated with the clock. Thus, the lamps can be lighted immediately when actuating a control key or the like, and in case of inversion.

According to this invention, a signal can be memorized only if this signal is adequate, i.e. when its duration is at least equal to the time elapsing between two successive rising fronts of the clock signal.

In the specific case of the flasher central unit, the wire transmitting the "warning" order is connected in parallel to the reset intput of the flip-flops constituting the state memorizing circuits so as to give the priority to this order with respect to the memorization of a right-hand or left-hand signal.

According to a characteristic form of embodiment of the instant invention, the current detection circuit comprises: a read or vibrating blade relay which, in case two lamps were energized or in service, will beat at the flasher frequency and close only very briefly when a current draw occurs in case only one lamp or bulb is in operation and cold; a twelve-stage counter of which the signals are used at the output of only three stages thereof, and a set of logic gates so arranged that when only one lamp is lighted the flasher operates at twice its normal rate, in order to attract the driver's attention.

According to another characteristic feature of the invention, the signals transmitted from the REED relay through the current detection circuit are received by a pair of tandem-arranged flip-flops so connected that the first flip-flop introduces an inertia corresponding to one beat or stroke of the system clock into the signal transmission, so that the flashing rate of the direction indicators can be maintained when, for example, the headlight main beams are flashed so as to produce a considerable transient drop in the storage battery voltage.

According to a further feature characterizing this invention, the flasher return circuit responsive to the inversion of the direction of rotation of the steering wheel which is detected by a pair of pickups comprises an input circuit consisting of a pair of cascade-arranged flip-flops for filtering the signals from the pickups and a circuit for generating the automatic return signal R for the state memorization circuit of the flasher central unit, said generating circuit comprising another pair of flip-flops interconnected via an AND function logic gate, the first flip-flop of this last-mentioned pair taking due account, at its input, of the signals received by the pair of pickups and also of the flasher condition, whereas the AND function logic gate receives at its second input a Z signal corresponding to another logic equation concerning the same signals as the input of the first one of said other pair of flip-flops.

According to another feature of this invention, a distance-responsive return circuit capable of inhibiting the operation of the automatic return circuit for preventing for example any untimely return of the flashers to its zero condition during parking manoeuvers is associated with the flasher return circuit responsive to the direction of rotation of the steering wheel, said distance-responsive return circuit extending from a REED bulb located for instance either behind speedo-meter or at the output of the change-speed mechanism on the speedo-meter transmission cable, said REED bulb generating signals for an input circuit comprising a pair of cascade-arranged flip-flops, the non-reversing output of the second flip-flop of this pair being branched as a clock input of a divider circuit via an AND gate connected through its second input to the working output of this divider circuit, said distance-responsive return circuit being branched between the output of the first one of said other pair of flip-flops described in the preceding paragraph and the AND function logic gate receiving the Z signal at its second input.

Furthermore, according to a complementary feature of the device of this invention it is possible to associate therewith a circuit whereby the vehicle can travel a distance of x meters from the time one switch has been actuated to the closing of the other switch. This circuit derives from the one described in the preceding paragraph in which the resetting input of the divider circuit is simply connected to the reversing output of said first flip-flop of said other pair, instead of connecting said resetting input simultaneously to the non-reversing output of said first flip-flop of the other pair and to the reversing output of the second flip-flop of the input circuit via an AND fonction logic gate.

According to a third modified embodiment of this invention, a circuit enabling the vehicle to travel another x meters from the time the second switch is closed may be incorporated in the circuitry, this corresponding to an extension of the time necessary for running x meters before issuing an order for producing the automatic stoppage. In this case, the reset input of the divider circuit is connected to the reversing output of the second flip-flop of the other pair described hereinabove in connection with the flasher automatic return circuit, and the stop signal is taken out from the output of the divider circuit.

In the specific case of a windshield wiper central unit, the latter comprises, in addition, a first frequency divider for dividing the clock frequency of the control device, and a second frequency divider, a windshield wiper blade rate-setting circuit, an AND function logic circuit connected in parallel to a pair of outputs of the state memorization circuit, and an OR function logic gate connected in parallel to the pair of outputs of the state memorization circuit, to the output of said rate-setting circuit and to one output of the stop and pre-positioning circuit.

In the specific case of a windshield wiper central unit, the input circuit comprises a pair of cascade-connected flip-flops in order to constitue a shift register.

According to this invention, the control device for the windshield wiper comprises essentially a three-way switch providing three transient positions corresponding for example the upper position to a low-speed blade operation, the lower position to a change-over between low-speed and high-speed, or vice-versa, and the intermediate position to the stop and stroke-by-stroke or manual operation. A push-button is provided for controlling the windshield washer with a predetermined time extension subordinate to the windshield wiper operation. When a suitable signal appears at one of its inputs, the input circuit will generate a signal for resetting the second frequency divider. The rate-setting circuit will thus transmit a signal permetting one to-and-fro movement of the windshield wiper blades. The stop and pre-positioning cell permits of resetting or zeroing the memorization circuits, resetting the memories to zero when a feed voltage is again applied thereto and when there neither "+coils" nor "+accessories" are operative. The stop push-button will also generate a signal for the OR function logic gate so that a single-stroke windshield wiper operation becomes possible.

In the specific case of the windshield wiper central unit, the state memorization circuit is arranged for memorizing three possible signals, namely: inversion between low-speed and high-speed (PV-GV) (B); low wiping rate (C) and windshield washer actuation (L). The memozization circuit is built up about three flip-flops and if we designate these flip-flops by the reference numerals 19, 20 and 22, respectively, the logic circuits associated therewith will confirm the following equations:

$$D_{19} = C + Q_{19} L^*$$

$$D_{20} = B(\overline{Q}_{19} + Q_{20}) + Q_{20} L^*$$

$$D_{22} = L^*$$

wherein D designates the input of one flip-flop, Q the output thereof and $L^*$ a converted signal from L.

According to another feature characterizing this invention, the rate-resetting circuit consists of a onestroke gate.

According to a further form of embodiment, the interface circuit for controlling each one of the energizing coils of the relays corresponding to the two speeds of operation of the windshield wiper motor comprises a pair of series-connected transistors having opposed polarities, the emitter of the first transistor being grounded, the second transistor having its collector grounded and its emitter connected in series with the relevant coil.

In the specific case of the lighting control central unit, the latter comprises according to the present invention: an input circuit connected to the reversing control switch, an inhibition and pre-positioning circuit, a state memorization circuit connected to the output of the two preceding circuits and an output interface connected indirectly to the output of the memorization circuit via logic gates and to the coils of the main beam and dimmed headlight energizing relays.

Thus, according to this invention, the headlight main beam and dimmer can be energized if the switch is set on position+ACC or+BOB(+accessories or+coils), according to the position of the main lighting switch and the highway code regulations in force in the Country concerned.

On the other hand and for the sake of simplification, the diagram of the central units and of the circuits constituting same are shown as being of the positive logic type. It is clear that anybody conversant with the art and capable of taking advantage of the teachings of the present invention would be able to draw diagrams corresponding to a negative logic embodiment. It is expressly understood that such negative logic diagrams would also remain within the scope of the present invention.

Other features and advantages of the invention will appear as the following description proceeds with reference to the attached drawings illustrating various forms of embodiment of the invention which are given by way of example, not of limitation. In the drawings:

FIG. 4 illustrates a typical form of embodiment of the synthesis circuit incoporated in the block diagram of FIG. 3;

FIG. 5 illustrates a typical form of embodiment known per se, of a clock circuit;

FIG. 19 is the block diagram of the windshield wiper central unit shown in FIG. 3;

FIG. 25 illustrates a typical form of embodiment of the windshield wiper control system;

FIG. 26 illustrates a typical form of embodiment of an input interface for a time-extension control system;

FIG. 27 is the block diagram of the lighting central unit illustrated in FIG. 3;

In the various figures of the drawings, the same reference numerals and symbols designate the same component elements.

Figure 1:
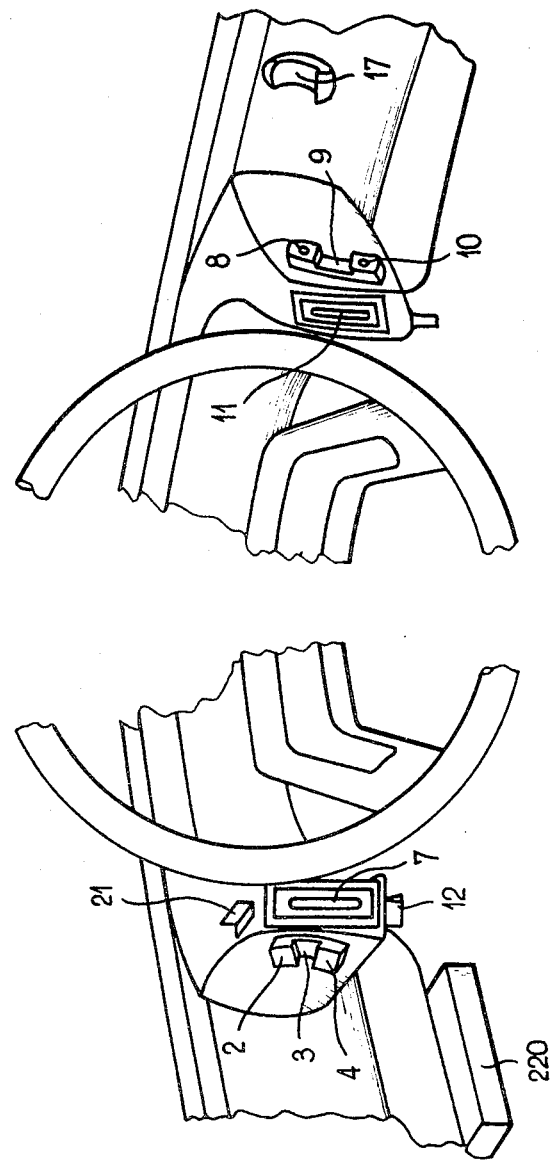
FIG. 1 illustrates the dashboard or instrument panel of a motor vehicle equipped with various switches of the transient contact and short-stroke type according to this invention.

Referring first to FIG. 1 and according to a first feature characterizing the present invention, the various controls for the headlights, windshield wiper, windshield washer pump and directional signal flashers are assembled and disposed around the steering wheel as follows:

On the left-hand side: the flashing direction indicators or signal lamps are controlled by means of a three-way switch, as follows:
  in the upper position, as at 2, the right-hand flash signal lamps are energized;
  in the central position, as at 3, the direction indicators or signal lamps are put out or stopped on purpose, that, by a direction of the driver;
  in the lower position, as at 4, the left-hand flash lamps are energized.

Also on the left-hand side, the headlights are controlled by means of a double control switch designated by the reference numerals 7 and 12.

On the dashboard or instrument panel, a three-way switch 21 is provided for selecting the positions corresponding to daylight, town and open road driving.

On the control plate, a transient-action switch 7 permits of reversing the dimmed-headlight to side-lamp positions and also the dimmed-headlight to main-beam headlight positions according to the momentary position of the control member of the general lighting switch 21 and also to the highway code regulations in force in the Country contemplated.

Each time the general lighting switch 21 or the transient switch 12 (for flashing the main-beam headlights) is actuated, the state of the vehicle lighting is modified also as a function of the highway code regulations of the Country concerned.

If need be, this device may be replaced by a sequential headlamp control of the type disclosed and illustrated in the French patent application published under the No. 2 332 656.

On the right-hand side: the windshield wiper motor is controlled by means of a three-way switch, as follows:
  in the upper position, the wiper blades are reciprocated once at eight seconds' intervals (reference numeral 8);
  in the lower position: the two wiper speeds can be inverted: from low speed to high speed, and vice versa (reference numeral 10), and
  in the intermediate or central position, the wiper blades are stopped and can be operated to perfom single, manually controlled strokes (reference numeral 9).

Another separate switch 11 is provided for actuating the electric pump of the windshield washer together with the windshield wiper with a four-second time extension for the latter.

Or course, other switch arrangements may be contemplated if desired for obtaining the above described control actions, such as:

Utilizing transient switches assembled by three with, centrally of each three-switch block, a warning or emergency control element, for instance:
  one element for stopping the flashers;
  a second element for actuating the horns centrally of the headlight control member, and
  a third element for energizing the windshield washer electric pump combined with an extension of the windshield wiper operating time.

In the case of a right-hand mounted steering wheel, the mounting plate 220 on which the computer 20 and the power members are assembled is disposed on the left-hand side under the dash board or instrument panel.

Figure 2:
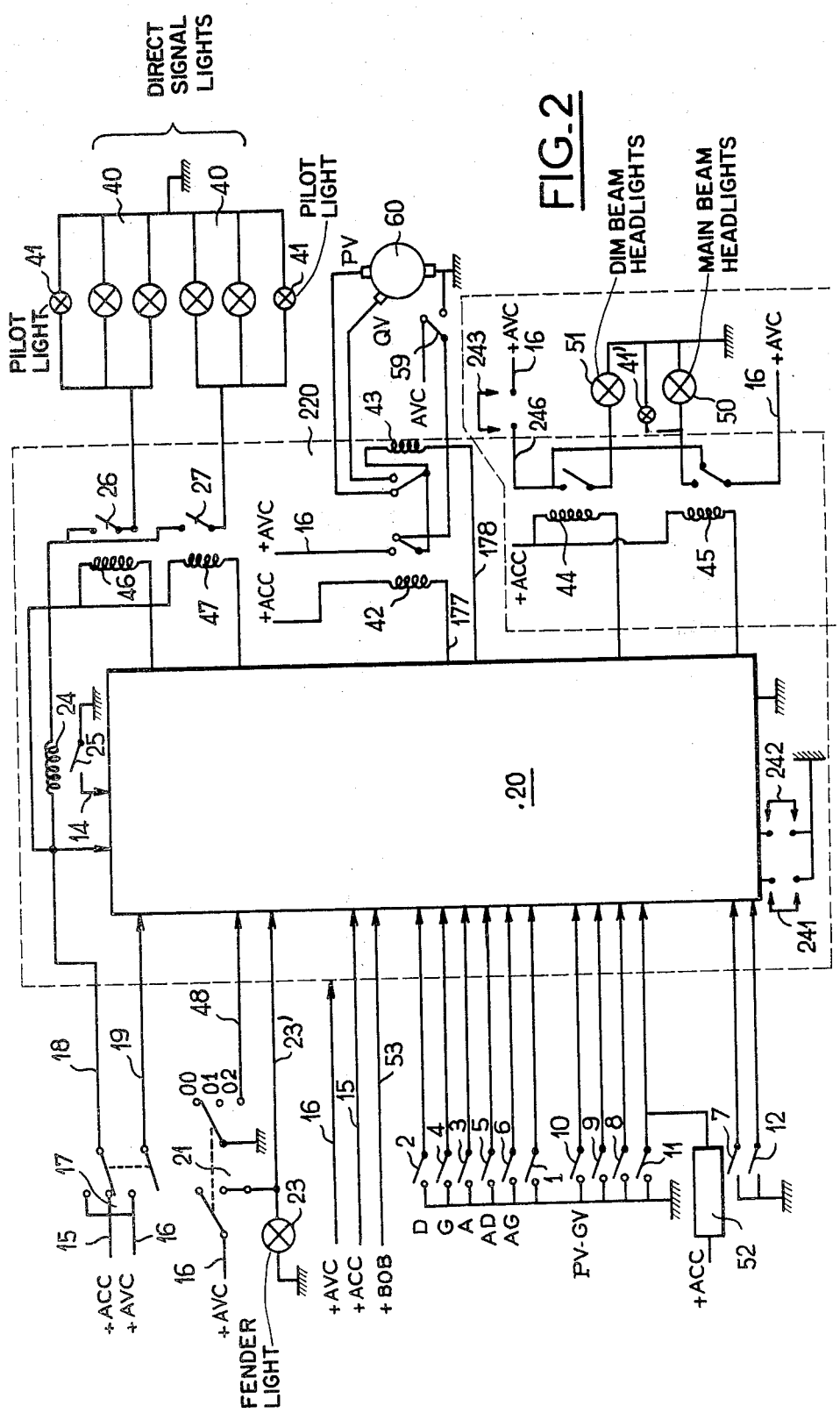
FIG. 2 is the block diagram of the signal control circuit according to the instant invention.

Referring now to FIG. 2 and considering this figure from left to right, it will be seen that all the input control utilizing transient, short-stroke contacts have been assembled in the left-hand portion of the figure. In the center, the mounting plate 220 (in dash lines) comprises a computer 20, relays 42 to 47 controlling directly the operation of the signal members such as flashing directional indicators 40, pilot light 41, mainbeam headlights 50, dimmed beam headlights 51 and a twospeed windshield wiper motor 60; however, this list should not be considered as a limiting or exhaustive one, since other devices and apparatus, such as fog lamps, and the like, may be included therein.

Reverting to the left-hand side of FIG. 2, there is shown in succession from top to bottom: a double switch 17 also illustrated on the instrument panel in the right-hand portion of FIG. 1, which is adapted to receive on its primary contacts via a wire 15 a "+accessories" voltage (+ACC) and via another wire 16 a "+before contact" voltage (+AVC), respectively. The term "accessories" utilized herein designates apparatus and devices such as a radio receiver, cassette recorders and players windshield wipers and directional signal lamps or flashers. The secondary contact of double switch 17 are connected on the one hand via a wire 19 to one input of computer 20 for delivering a warning signal thereto, and on the other hand via another wire 18 to the energizing coil 24 of a REED relay of which the movable contact arm 25 is branched between the ground and another input of computer 20 via a wire 14 for detecting the current intensity, and thence to the parallel-connected movable contact arms 26 and 27 of a pair of noise-producing relays, to a pair of directional signal lamps 40 and also to a pilot light 41 which are connected in parallel between the ground and each movable contact 26, 27. On the other hand, the energizing coils 46 and 47 of the pair of noise-producing relays are connected in parallel between wire 18 and two outputs of computer 20. This wire 18 is also connected to one input of computer 20 for energizing the power section thereof which is to supply current to the directional flasher system as will be explained presently with reference to FIG. 2.

A general lighting switch 21 comprises a set of three primary and secondary contacts 00, 01 and 02. A movable primary contact arm is connected via wire 16 to the "+before contact" terminal (+AVC) and the pair of lower primary contacts are connected to the side or fender lights 23 and thence on the one hand to the ground and on the other hand via wire 23' to one input of computer 20 in order to deliver the necessary voltage, namely "+side lamp" voltage. The lower secondary contact designated by the reference numeral "02" is connected to another input of computer 20 via a wire 48 and the latter is grounded when the movable contact arm co-acting with the various secondary contacts engages contact "02", said movable contact arm is grounded.

Below the general lighting switch 21 are two sequential wires 15 and 53 transmitting to two inputs of computer 20 the "+accessories" (+ACC) and "+coil" (+BOB) voltages. A third wire 16 feeds a "+before contact" voltage (+AVC) for the relay power controls as exeplained hereinafter.

Below these three wires, a series of twelve transient control switches designated by reference numerals 1 to 12 are shown as having their inputs grounded in parallel and their outputs connected to as many inputs of computer 20. These transient control switches have the following functions:

Switch 1: distance-responsive flasher return; this switch is located either behind the speedometer or at the change-speed mechanism output on the speedometer transmission cable.

Switch 2: right-hand directional signal lamps, or flashers.

Switch 3: voluntary stopping of flashers.

Switch 4: left-hand directional signal lamps, or flashers.

Switch 5: right-hand return of flashers.

Switch 6: left-hand return of flashers.

Switch 7: main-beam to dimmed headlight, or dimmed headlight to side lamp reversing switch.

Switch 8: setting of windshield wiper sweeping rate.

Switch 9: one-stroke windshield wiper control.

Switch 10: windshield wiper normal operation at low speed and high speed.

Switch 11: windshield washer and time extension also illustrated in FIG. 1.

Switch 12: main-beam flashing control.

Of course, this list should not be construed as a limiting one since various other apparatus controls may be added thereto, as will readily occur to those conversant with the art.

The output of transient control No. 11 is connected to one terminal of an electric pump 52 delivering fluid to the windshield washer and having its other terminal connected to the "+accessories" (+ACC) terminal.

Complementary to the above described relays on the right-hand portion of FIG. 2 is a relay for energizing the headlight main beam filaments 50 which comprises a coil 45 connected between one output of computer 20 and a "+ACC" terminal, the relay's fixed terminal for closing the movable arm being connected to one side of the bulbs of said headlights 50 which have their other ends grounded. A pilot lamp 41' is connected in parallel to each headlight 50, the fixed contact of the movable arm associated with this pilot lamp being connected to the fixed terminal +AVC while its fixed opening terminal is connected to the fixed closing terminal of relay 44 for energizing the dimmed headlights 51. A pair of straps or shunts 241, 242 are provided for adapting the circuit operation to the various international regulations and rules as will be explained presently. Relay 42 and 43 for energizing the windshield wiper motor 60 at low speed (PV) and high speed (GV) have their energizing coils 42 and 43 connected between the corresponding outputs of computer 20 and the +ACC terminal of coil 42. As to coil 43, it is connected at its second end to the fixed top of its movable arm connected in turn to the fixed top of the movable arm of relay 42. In the inoperative condition, the movable arm of relay 42 is connected to the fixed top of the movable arm of a switch 59 for automatically returning the windshield wiper blades to their inoperative position, for instance close to the bottom edge of the windshield. The movable arm of switch 59 is rigid with the output shaft of windshield wiper motor 60. In the inoperative condition, the movable contact arm of relay 43 is connected to the low-speed terminal PV of motor 60. In the operative position the movable arm of relay 42 is connected to terminal +AVC and the movable arm of relay 43 is connected to the high-speed terminal GV of motor 60. Switch 59 is of the rotary collector type of which the major portion is connected to terminal +AVC with only a small segment grounded and swept by the movable arm of switch 59 when the windshield wiper is in its inoperative position, an arrangement well known to those conversant with the art.

Figure 3:
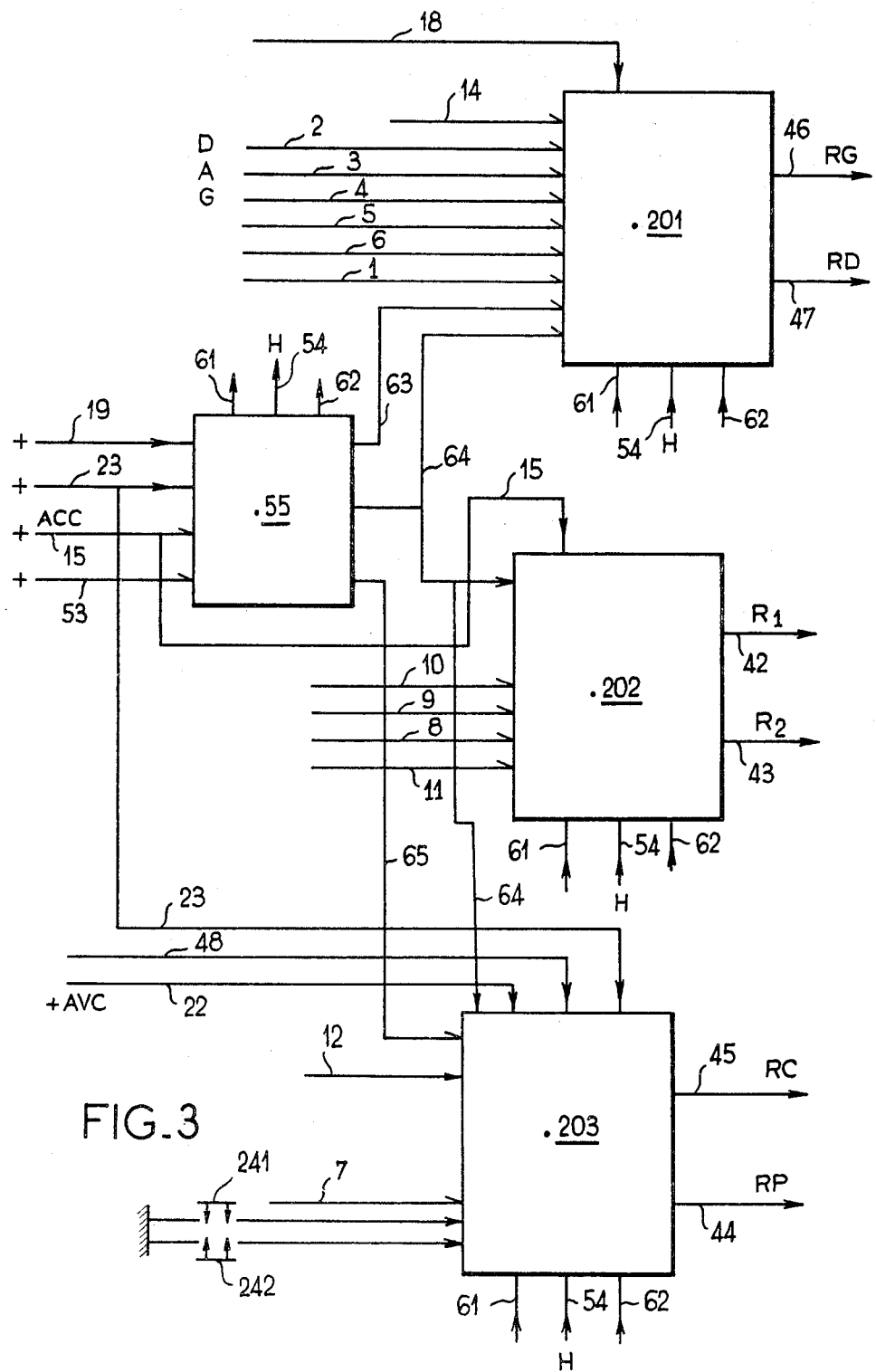
FIG. 3 illustrates more in detail the signal control circuit of FIG. 2.

FIG. 3, in which the same reference numerals designates the same component elements as in FIG. 2, it will be seen that the computer 20 comprises three essential sections, namely: a first section or control circuit unit 201 for processing information concerning the control of the directional indicator flashers 40; a second section or control circuit unit 202 for processing the information concerning the actuation of the windshield wiper in order to apply a suitable energizing current to the driving motor 60, and a third section or control circuit unit 203 for processing information concerning the lighting system in connection with the main beam headlights 50 and dimmed headlights 51.

The computer 20 shown in FIG. 2 further comprises a synthesis circuit 55 of which the constructional details will be described presently with reference to FIG. 4; this circuit 55 comprises four inputs connected via wire 19 to the "+warning" terminal, via wire 23 to the "+side lamp" terminal, via wire 15 to the "+ACC"

terminal, and via wire 53 to the "+coil" terminal. Three output wires are shown in the upper portion of synthesis circuit 55; the first wire 61 on the left is divided into three branch lines leading to corresponding inputs of sections 201, 202 and 203, respectively, so as to deliver a reference voltage thereto; the second wire 54 is connected to the clock output illustrated in FIG. 5, and the third wire 62 is connected to the pre-positioning circuit illustrated in FIG. 4. These connections are found in the lower portion of each computer. On the right-hand side of the synthesis circuit 55 are also three output wires, namely a wire 63 leading to computer 201 connected to the flashers for transmitting the warning orders, a wire 64 connected in parallel to sections 201, 202 and 203 for transmitting inhibiting or strobe orders, and a wire 65 connected to computer 203 alone for transmitting validation orders in connection with the lighting system thereto.

Section 201 comprises two outputs RG and RD connected to the energizing coils 46 and 47, respectively, of a pair of noise-producing relays associated with flashers 40 for the direction indicators. Section 202 has two outputs $R_1$ and $R_2$ connected to the pair of coils 42 and 43, respectively, for energizing and driving the windshield wiper motor 60 at the desired wiper blade speed. Finally, section 203 has two outputs RC and RP connected to the energizing coils 44 and 45 concerning the relays for dimmed headlights 51 and main beam headlights 50, respectively.

FIG. 4 illustrates a typical form of embodiment of the synthesis circuit 55 associated with the three sections or control circuit units; namely flasher control unit 201, windshield wiper control unit 202 and lighting control unit 203. On the left-hand side of FIG. 4 the double switch 17 called warning contact and, thereunder, the general lighting switch 21, are illustrated. Thus, the following voltages can be fed to this synthesis circuit 55: via wire 19, the "+warning" voltage: via wire 23, the "+side lamps" voltage; via wire 15, the "+ACC" voltage and via wire 53, the "+coil" voltage. These four input wires are connected to a diode-type logic circuit providing an OR function and comprising a diode 22 inserted in wire 19, a diode 30 inserted in wire 23, two diodes 56 and 57 inserted in series in wire 15 and a diode 58 inserted in wire 53. The outputs of diodes 57, 30 and 22 are interconnected and their common conductor extends beyond these diodes to constitute the output conductor 61, i.e. the conductor supplying current in common to the three units 201, 202 and 203 via a series connected resistor 66, a Zener diode 67 and a capacitor 68 in parallel between said conductor 61 and the ground. From an integretor RC 69 inserted between conductor 61 and the ground, another so-called pre-positioning conductor 62 extends likewise to the three units 201, 202 and 203. The inputs of diodes 22, 30 and 57 are connected to the relevant bases of three transistors 70, 71 and 72, respectively, via a series resistor and a grounded resistor branched on the wire between each series resistor and the transistor. The collectors of these three transistors are grounded and their emitters are each connected in parallel, via a series resistor, to conductor 61. The output 63 taken from the emitter of transistor 70 transmits the warning order to flasher control unit 201; the output 64 connected to the emitter of transistor 72 transmits inhibition or strobe orders in parallel to the flasher, windshield wiper and lighting control units 201, 202 and 203 and the output 65 connected to the emitter of transistor 71 transmits validation orders to the lighting control unit 203.

Therefore, with this synthesis circuit 55 of FIG. 3 a common current supply to the three units 201, 202 and 203 is obtained via conductor 61. The diode logic circuit 22, 30, 56, 57 and 58 provides the function "+warning OR+ACC . OR+side lamps OR+coils". If one of these four "+" energizes the synthesis circuit 55, the energizing voltage for the three units 201, 202 and 203 is placed on the output conductor 61.

The synthesis circuit 55 also constitutes an input interface for inhibiting or validating one or a plurality of central units via outputs 63, 64 and 65. Thus, it is possible to memorize information in the flasher control unit 201, windshield wiper control unit 202 and lighting control unit 203 if terminal "+ACC" via conductor 15 or terminal "+coil" via conductor 53 energizes the synthesis circuit 55.

The integrator 69 having a time constant greater than that of the supply circuit comprising resistor 66 and capacitor 68 permits via conductor 62 common to the three units, 201, 202 and 203 the proper pre-positioning of all the logic circuits, notably the flip-flops within said three central units when voltage is applied thereto.

FIG. 5 illustrates a typical form of embodiment of a clock beating at a frequency of, say, 768 Hz, which drives the three units 201, 202 and 203 via conductor 54. The three units are entirely synchronized by the single, permanently beating clock of FIG. 5.

The REED relay 24, 25 of FIG. 2 is capable of detecting the failure of one of lamps 40.

For flasher control unit 201 and windshield wiper control unit 202, stopping is a priority. When a control is grounded permanently, for instance in case of a jammed control key, the corresponding function can be stopped by depressing the stop key, namely keys 3 and 9 of FIG. 2.

Figure 6:
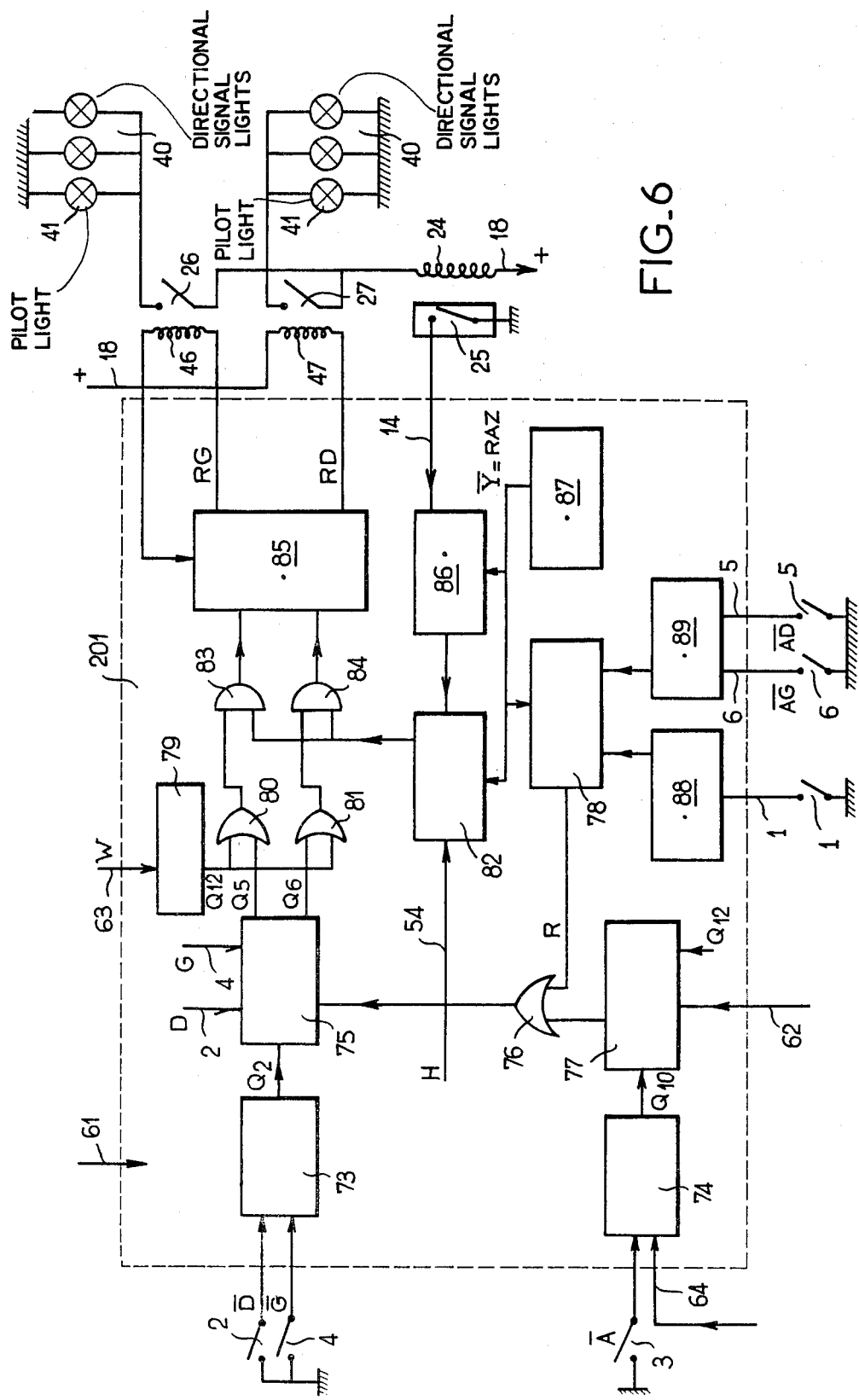
FIG. 6 is another block diagram of the flasher central unit of FIG. 3.

FIG. 6, which is a block diagram of the flasher control unit 201 shown in the upper portion of FIG. 3, illustrates on a larger scale the unit 201 within a dash-line rectangle. On the left-hand side of FIG. 6, transient switches 2, 4 and 3 are shown; these switches, possibly followed by logic inverter (not shown), are capable, when actuated by the driver of the motor vehicle, of delivering the reverse of the controls concerning the right-hand directional indicators, the left-hand directional indicators, and the stopping of flashers for input circuits 73 and 74. The detail of input circuit 73 will be discussed presently with reference to FIG. 7. Reverting to FIG. 6, the output $Q_2$ of input circuit 73 is connected to one input of a right-hand and left-hand memory circuit 75 to be described presently with reference to FIG. 8. The memory circuit 75 is also connected via another pair of inputs to transient switches 2 and 4, and also via a fourth input to an OR gate 76 connected in turn at one of its ends to a stop and pre-positioning circuit 77, and finally via its second input to the output of an automatic flasher return circuit 78. The flasher stop and pre-positioning circuit 77 is connected via a first input to the output of input circuit 74 which delivers a signal $Q_{10}$, via a second input to the prepositioning conductor 62 of FIG. 4, and receives via a third input a signal $Q_{14}$ from the output of input circuit 79 connected through its input to conductor 63 transmitting the warning signal W. This input circuit 79 also transmits a signal $Q_{12}$ to a second output connected in parallel as a first input to a pair of OR gates 80 and 81 connected through their second inputs to a pair of outputs of the right and left-hand memory circuit 75 delivering signals $Q_5$ and $Q_6$, respectively. Clock 54 of FIG. 5 is connected to a frequency divider 82 of which the output is connected in parallel as a first input to a pair of AND-function gates 83 and 84 connected via their second inputs to the outputs of OR function gates 80 and 81, respectively. These AND-function gates 83 and 84 have their outputs (acting as inputs) connected to an output interface 85 containing the power transistors for controlling the energizing coils 46 and 47 of the relays associated with flasher directional indicator lamps 40 and their pilot lamps 41.

The movable contact arm 25 of REED relay 24 is connected via wire 14 to one input of a current detecting circuit 86 having its output connected to frequency divider 82. This current detector circuit 86 will be described more in detail presently with reference to FIG. 9. A circuit 87 corresponding to the logic function: NOR warning, NOR flashers, which may be comprised of a NOR function logic gate and emitting under predetermined conditions a signal $\overline{Y}=RAZ$, has its output connected in parallel to the current detector circuit 86, to the automatic flasher return circuit 78 and to the frequency divider 82. Finally, the automatic flasher return circuit 78 is connected on the one hand to the transient switch 1 controlling the distance-responsive flasher return via an input circuit 88, and on the other hand to transient switches 5 and 6 for the right-hand and left-hand return of the flasher control member, respectively, which are possibly followed by inverters (not shown) via an input circuit 89.

In short, this circuit operates as follows: three transient switches 2, 4 and 3, denoted $\overline{D}$ (for "right-hand"), $\overline{G}$ (for "left-hand") and $\overline{A}$ (for "Stop") are adapted to control the flashing directional signal lamps 40. When a proper signal is generated in input circuit 73, i.e. when a signal having at least the same duration as a complete clock signal between two successive rising fronts of this last-mentioned signal, said input circuit 73 generates a signal $Q_2$ for memorizing the control pulse $\overline{D}$ or $\overline{G}$ in circuit 75. Then, the various devices of the current detecting circuit 86, frequency divider 82 and automatic circuit or device return 78 are validated by the output RAZ of circuit 87 assuming a low level. The flasher lamps 40 assume the "lighted" or "ON" phase immediately as the memorization begins. A servo-action or subservience beginning at the REED relay 25 and comprising the current detecting circuit 86 permits of obtaining a double beat rate of the noise-producing relays 46 and 37 and of the remaining flashing lamp 40 in case of failure of one or a plurality of lamps, as will be explained more in detail hereinafter.

The flashers 40 are stopped either by the transient switch $\overline{A}$ or 3, or by the automatic return circuit or device 78. Control $\overline{A}$ or 3 has priority over $\overline{G}$ and $\overline{D}$ or 4 and 2. Assuming, for instance, that $\overline{D}$ is grounded permanently due to the fact that the key or push-button of the corresponding transient switch is jammed, the flashers can be stopped by actuating $\overline{A}$. The warning control is made operative by causing a permanent+- connection via wire 19 and double switch 17. A high lever will be obtained on wire 63 and also for signal $Q_{12}$ in parallel to $Q_5$ and $Q_6$. During the warning operation the memorization of signals $\overline{D}$ and $\overline{G}$ is inhibited by feeding signal $Q_{12}$ to stop control 77.

Figure 7A:
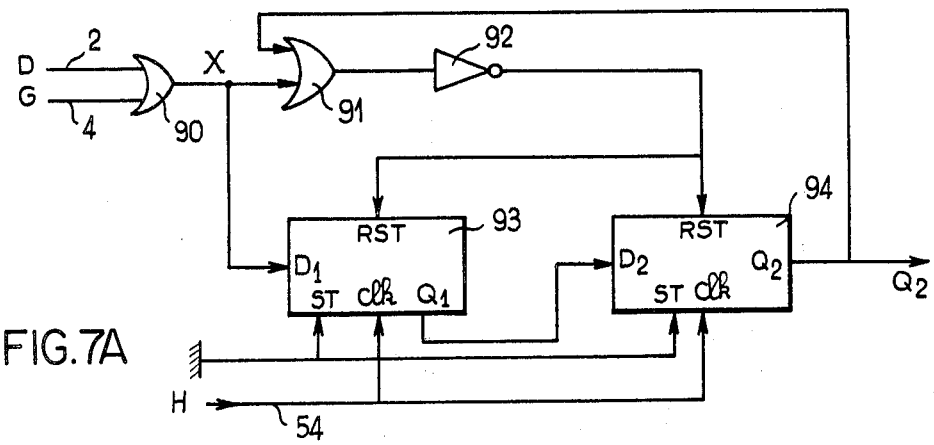
FIG. 7A illustrates a typical form of embodiment of a first unit circuit of FIG. 6

Referring now to FIG. 7A illustrating a typical form of embodiment of input circuit 73 with non-synchronized clock, together with the waveform diagrams (FIG. 7B) of the main corresponding signals, this form of embodiment being also applicable to input circuit 74, a pair of input wires 2 and 4 are connected to an OR functional gate 90 delivering a signal X at its output. This signal X is fed on the one hand as a first input to an OR function gate 91 and on the other hand as an input $D_1$ of a D-type flip-flop 93. The output $Q_1$ of this flip-flop 93 is fed to the input $D_2$ of a second D-type flip-flop 94 delivering a signal $Q_2$ at its output. A feedback path returns the output signal $Q_2$ as a second input to OR function gate 91 followed by a logic inverter 92 having its output connected in parallel to the reset input of flip-flops 93 and 94. The set inputs of flip-flops 93 and 94 are grounded and the clock of FIG. 5 is connected via its output wire 54 to the clock input of flip-flops 93, 94.

Save if otherwise stated, all the flip-flops or univibrators used in the circuits described hereinafter are of the D-type manufactured by NATIONAL SEMICONDUCTORS and listed in their Catalogue under the reference No. 4013. In connection with the mode of operation of a D-type flip-flop No. 4013, it may be reminded that the signal at input D is transferred to the output Q in coincidence with the rising front of clock signal H. Setting and resetting are obtained at a high level of the corresponding signal, i.e. of the set signal or reset signal.

Figure 7B:
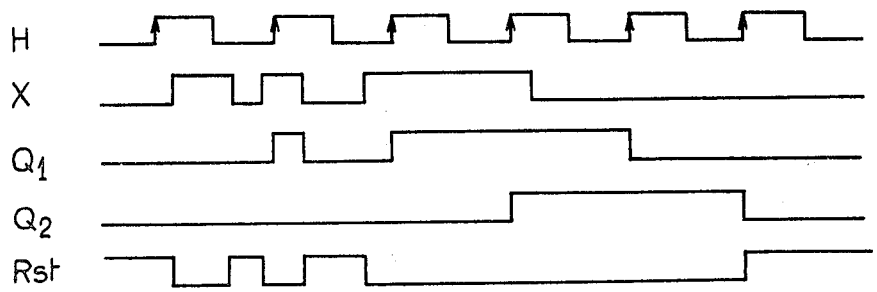
FIG. 7B is the waveform diagram of the various correponding signals.

Referring now to the waveform diagrams of FIG. 7B, it will be seen that the notion of signal proper at the input implies that the signal X preserves the value "one" at least during the interval between two successive rising fronts of the clock signal so that signal X or $D_1$ be transferred to output $Q_1$ of first flip-flop 93, and that, when this signal appears at the input $D_2$ of second flip-flop 94, the latter switches to its state "one" at its output $Q_2$ coincident with a rising front of clock signal H.

The input circuit 79 concerning the warning signal W will be discussed presently.

Figures 8A, 8B:
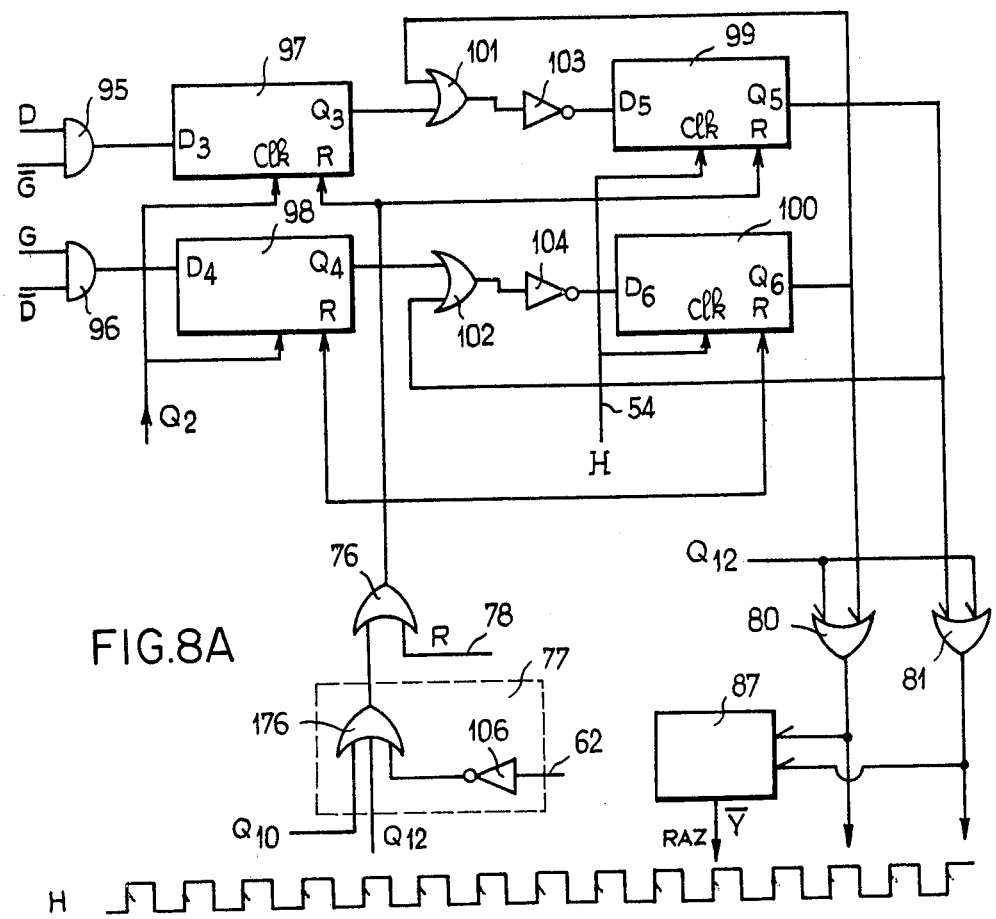
FIG. 8A illustrates a typical form of embodiment of the portion of the circuit shown in FIG. 6 concerning the data memorization when operating under warning conditions.
FIG. 8B is the waveform diagram of the various corresponding signals.

Referring to FIGS. 8A and 8B, concerning the memorization of flasher information, two AND-function input gates 95 and 96 receive the following information, respectively: the first gate 95 receives "Right-hand" and the reverse of "Left-hand", and the other gate 96 receives "Left-hand" and the reverse of "Right-hand". The outputs of these AND gates 95 and 96 are connected to the inputs $D_3$ and $D_4$ respectively of a pair of D-type flip-flops 97 and 98. The output $Q_3$ of flip-flop 97 is connected to the input $D_5$ of another D-type flip-flop 99 via a series connection comprising an OR gate 101 and a logic inverter 103. Similarly, the output $Q_4$ of flip-flop 98 is connected to the input $D_6$ of a D-type flip-flop 100 via the series connection of an OR gate 102 with a logic inverter 104. The output $Q_5$ of flip-flop 99 is connected on the one hand to one input of an OR gate 81 and on the other hand, as a second input, to the OR gate 102 interposed between the output $Q_4$ of flip-flop 98 and the input $D_6$ of flip-flop 100. Similarly, the output $Q_6$ of flip-flop 100 is connected on the one hand to one input of an OR gate 80 and on the other hand, as a second input, to the OR gate 101 interposed between the output $Q_3$ of flip-flop 97 and the input $D_5$ of flip-flop 99. The clock inputs of flip-flops 97 and 98 are connected in parallel to the output $Q_2$ of flip-flop 94 of FIG. 7A. The general clock of the system is connected via wire 54 to the clock inputs of flip-flops 99 and 100. The OR gate identified at 76 in FIG. 6 is connected in parallel to the reset inputs of four flip-flops 97, 98, 99 and 100. As in the case illustrated in FIG. 6, the OR gate 76 of FIG. 8A has one input connected to the output of the automatic flasher return circuit 78 and another input connected to the stop and prepositioning circuit 77 within which it is connected to the output of another logic OR gate 176 receiving at its input: signal $Q_{10}$ from input circuit 74 of FIG. 6, signal $Q_{12}$ from input circuit 79 of FIG. 6, and a third signal from the propositioning circuit 62 of FIG. 4 via a logic inverter 106. The output of input circuit 79 transmitting signal $Q_{12}$ is still connected in parallel as a second input to OR gates 80 and 81 having their outputs connected as inputs to circuit 87 of FIG. 6 which generates at its output the return signal $\overline{Y}$ (RAZ) for the current detector circuit 86, the frequency divider 82 and automatic flasher return circuit 78, respectively. Circuit 87 is of the negative logic type expressing NEITHER $Q_5$, NOR $Q_6$, NOR $Q_{12}$=RAZ. The outputs of gates 80 and 81 (FIG. 8A) are also connected to the inputs of AND gates 83 and 84 of FIG. 6.

The waveform diagrams of FIG. 8B illustrate the change, as a function of time, of the main signals appearing at the main points of the circuit of FIG. 8A, notably of signals $Q_3$, $Q_4$, $Q_5$ and $Q_6$ at the outputs of the four flip-flops 97, 98, 99 and 100 in case the following signals appear at the input of the circuit of FIG. 7A.

(1) An inherent signal D producing a signal $Q_2$ at the output of flip-flop 94, which is memorized in flip-flop 97 at $Q_3$ and causes signal $Q_5$ to be transmitted from the output of flip-flop 99;

(2) after a D→G inversion (i.e. from right to left) an inherent signal G memorized in flip-flop 98 as $Q_4$, which causes a signal $Q_6$ to be generated at the output of flip-flop 100.

The last three lines of the waveform diagrams of FIG. 8B illustrate the signals obtained in case of warning operation (W). The fourth line from the bottom of these waveform diagrams shows that the RAZ signal is at value "one" when the system is inoperative:

RAZ=$\overline{Y}$=NOR flashers, NOR warning, and also assumes the value "one" during one clock period during a D⇌G inversion.

With this signal it is possible to reset the assembly comprising the return circuit 78, the current detecting circuit 86 and, more particularly, the frequency divider 82 of FIG. 6. Thus, it is possible to energize the lamps 40 and 41 immediately when actuating controls 2 or 4. Similarly, during a D⇌G inversion, for example, the left-hand lamps are lighted instantaneously. In actual practice, the first lighting-up is attended by a delay of a few milliseconds.

During the warning operation, a "one" is fed in parallel with signals $Q_5$ and $Q_6$ via OR gates 80 and 81. A "one" is also fed to the reset input R of flip-flops 97, 98, 99 and 100 by means of a signal $Q_{12}$ in order to prevent the memorization of a D (right) or G (left) signal.

Should two "D" and "G" controls be actuated simultaneously, if an increasing front of signal H separates the occurence of these two control actions, only the first one is taken into account. If not, the system remains inoperative due to the functions D and $\overline{G}$ on AND gate 95, and functions G and $\overline{D}$ on AND gate 96.

Figure 9A:
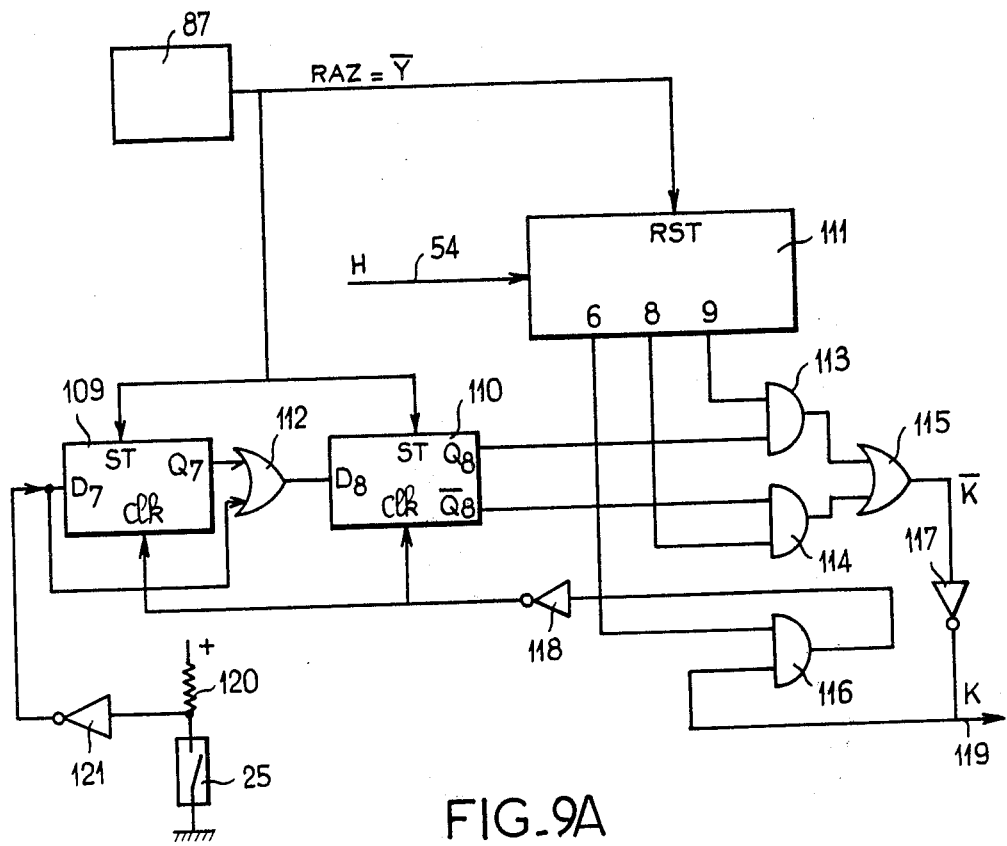
FIG. 9A illustrates a typical form of embodiment of the circuit portion of FIG. 6 concerning the detection of the flasher intensity.

According to FIG. 9A, illustrating a typical form of embodiment of the circuits 82 and 86 of FIG. 6 in connection with the current detection for flashers 40, this circuit comprises essentially a pair of D-type flip-flop 109 and 110, and a composite flip-flop 111 of the type referenced CD 4040 in the catalogue of NATIONAL SEMICONDUCTORS. This composite flip-flop 111 constitutes a twelve-stage counter consisting of twelve series-connected flip-flops. It will be seen that the signal frequency is logically divided by two from one flip-flop to the next flip-flop. In the composite flip-flop 111 employed in the present invention the signals are picked up at the output of the flip-flops constituting ranks 6, 8 and 9. A circuit comprises in series between ground and "+supply" terminal a resistor 120 and also the movable contact arm 25 of the REED relay. The input $D_7$ of flip-flop 109 is connected to this circuit at a point common to resistor 120 and movable contact arm 25 of said REED relay via a logic reversing switch 121. The output $Q_7$ of this flip-flop 109 is fed as a first input to the OR gate connected via its second input to a wire leading to input $D_7$ of flip-flop 109. The output of OR gate 112 is fed to the input $D_8$ of the second flip-flop 110 having its outputs $Q_8$ and $\overline{Q_8}$ connected to the inputs of a pair of AND logic gates 113 and 114, respectively, these two logic gates 113 and 114 receiving as a second input the outputs 9 and 8, respectively, of composite flip-flop 111. The outputs of AND logic gates 113, 114 are fed as inputs to an OR logic gate 115 having its output connected to a logic inverter 117 having in turn its output adapted to transmit a rate-setting signal K via wire 119, said signal K being superposed in the AND logic gates 83 and 84 to the control signals, respectively, received by the energizing coils of noise-producing relays 46 and 47 actuating the flashers 40 according to the arrangement shown in FIG. 6. The output of logic inverter 117 is connected to one input of a logic AND gate 116 having its second input connected to the output 6 of composite flip-flop 111. The output of this AND logic gate is connected through a logic inverter 118 to the clock inputs of flip-flops 109 and 110. The circuit 87 already illustrated in FIGS. 6 and 8A and emitting a reset signal $\overline{Y}$ has its output connected on the one hand to the reset input of composite flip-flop 111 and on the other hand, in parallel, to the inputs for setting to "one" the single D-type flip-flops 109 and 110.

Figure 9B:
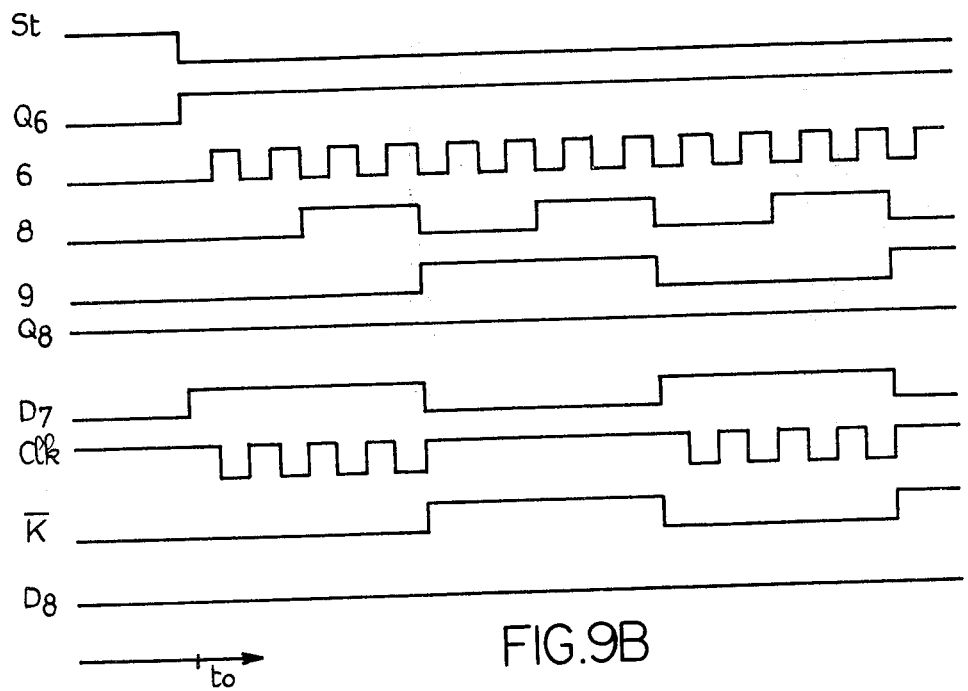
FIG. 9B is the waveform diagram of the various corresponding signals as obtained when both lamps are in operation.
Figure 10:
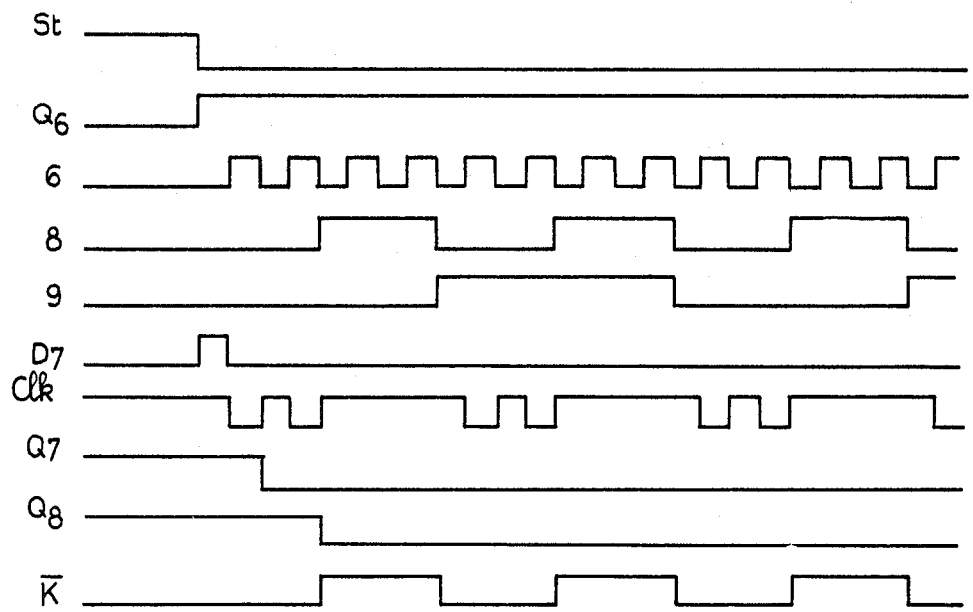
FIG. 10 illustrates the waveform diagrams of the various signals concerning the circuit of FIG. 9 in case only one lamp is operative.

The waveform diagrams of FIG. 9B illustrate the evolution of the main signals concerning the operation of the circuit of FIG. 9A in case two flashing lamps, on one side of the motor vehicle, operate simultaneously. A comparison may be made between these waveform diagrams and those of FIG. 10 illustrating the evolution, during the same time period, of the same signals in case only one lamp is lighted. The purpose of this arrangement is to impose a double rate of flashing to the lamp and to the noise-producing relay controlling same in case of failure of one of the two lamps. If both flashing lamps 40 intended for simultaneous operation are lighted intermittently as required, the REED relay 24, 25 beats at the flasher frequency. If only one lamp is on or in operation, the REED relay is closed only briefly when the current draw occurs if the lamp is cold. This effect is observed through a pulse shown in FIG. 10, line 6, in the signal received by input $D_7$ of flip-flop 109. The difference with the corresponding signal shown in FIG. 9B, line 7, is clearly visible. In the diagram of FIG. 10 it will also be seen that the output $Q_8$ assumes the state of $D_7$ when the lamps are lighted and at a time when the current flowing through lamps 40 has assumed a permanent value. The memorizations take place on the ascending fronts of clock signal Clk (see FIGS. 9B and 10). If we compare the penultimate line of the waveform diagrams of FIG. 9B and the last line of the waveform of FIG. 10, we see that the frequency of rate-setting signal K, when a single lamp 40 is operative, is twice that of signal K in case both lamps 40 are operative, so that the desired requirement is met. The flashing lamps 40 are lighted when signal K is at its lower value.

Figure 11:
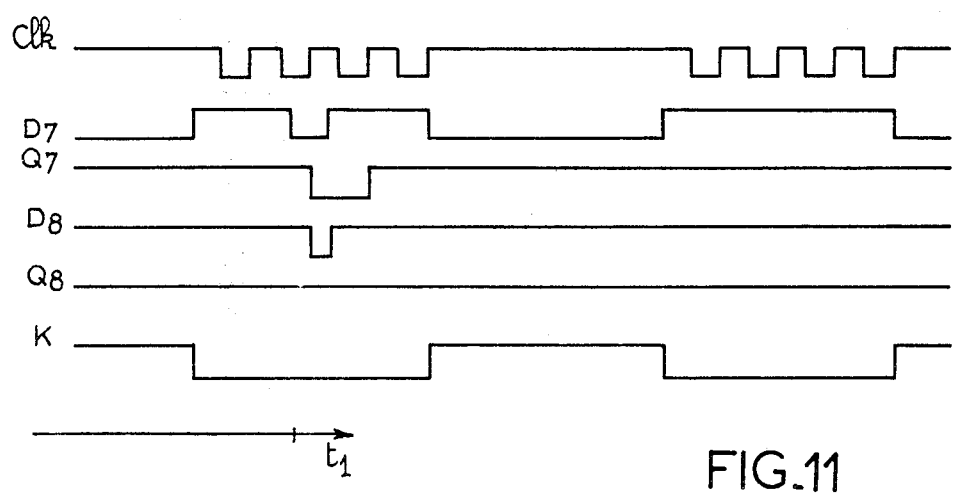
FIG. 11 illustrates explanatory waveform diagrams concerning the various signals obtained during the operation of flip-flop D7-Q7 of FIG. 9 in a particular case.

The waveform diagrams of FIG. 11 relate to the operation of flip-flop 9 in the specific case where the driver causes the main beam headlights to flash so that the battery voltage undergoes a considerable temporary drop attended by the opening of REED relays 24, 25, when both directional signal lamps are lighted. Assuming that at a time $t_1$ shown in FIG. 11 a stray opening of REED relay 25 is caused by said battery voltage drop, the signal at the input $D_7$ of flip-flop 109 assumes a zero value during a short time as illustrated in line 2 of FIG. 11. Line 3 illustrates the output signal $Q_7$ resulting there from and line 4 shows the corresponding input signal $D_8$ in the second flip-flop 110. Line 5 shows the corresponding signal $Q_8$ emitted from the second flip-flop and having the same waveform as in the general case illustrated in FIG. 9, line 6, of the waveform diagrams. Finally, it will be seen that the rate setting signal K remains at the simple frequency, which is the purpose contemplated.

Most directional indicators or signal flashers mounted on motor vehicles have the automatic return function. This return movement is obtained as a rule through fully mechanical means by using friction elements or a cam restoring the control lever to its initial or inoperative position. In case the flasher control is such as to prevent the mounting of direct return means, pickups may be provided for instance in the vicinity of the steering wheel hub for performing an automatic return action.

Figure 12:
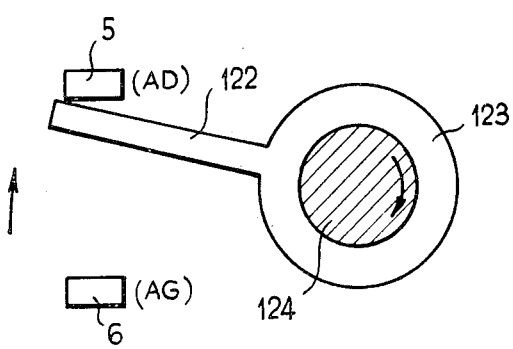
FIG. 12 illustrates diagrammatically a mechanical system for determining the direction of rotation of the steering wheel.

According to a specific form of embodiment of the present invention and as illustrated in FIG. 12, a pair of contacts AD and AG are provided for determining the direction of rotation of the steering wheel. An arm 122 rigid with a friction ring 123 surrounding the steering wheel hub 124 is adapted to close a contact AG or AD according to the direction in which the steering wheel is rotated.

If, for instance, the driver actuates the left-hand flasher lamps, to stop this flasher automatically, it is necessary, after having turned the vehicle to the left, to rotate the steering wheel in the opposite direction, i.e. to the right.

Therefore, the left-hand stop contact AG will close when the steering wheel is rotated to the left; for this purpose, microswitches or REED relays may be used. Similarly, the right-hand stop contact AD is closed when the wheel is rotated to the right or clockwise.

From the time the directional signal lamps are actuated, to stop and put out these lamps automatically it is necessary:

if the left-hand signal lamps are lighted intermittently, to close contact AG, then, to close the opposite contact.

Now to avoid either external strays, or strays caused by contact rebounds, a single input cell 89 consisting of a pair of D-type cascade-mounted flip-flop as in the example shown in FIG. 7A in combination with flip-flops 93 and 94, except for the input signals, is used.

Figure 13:
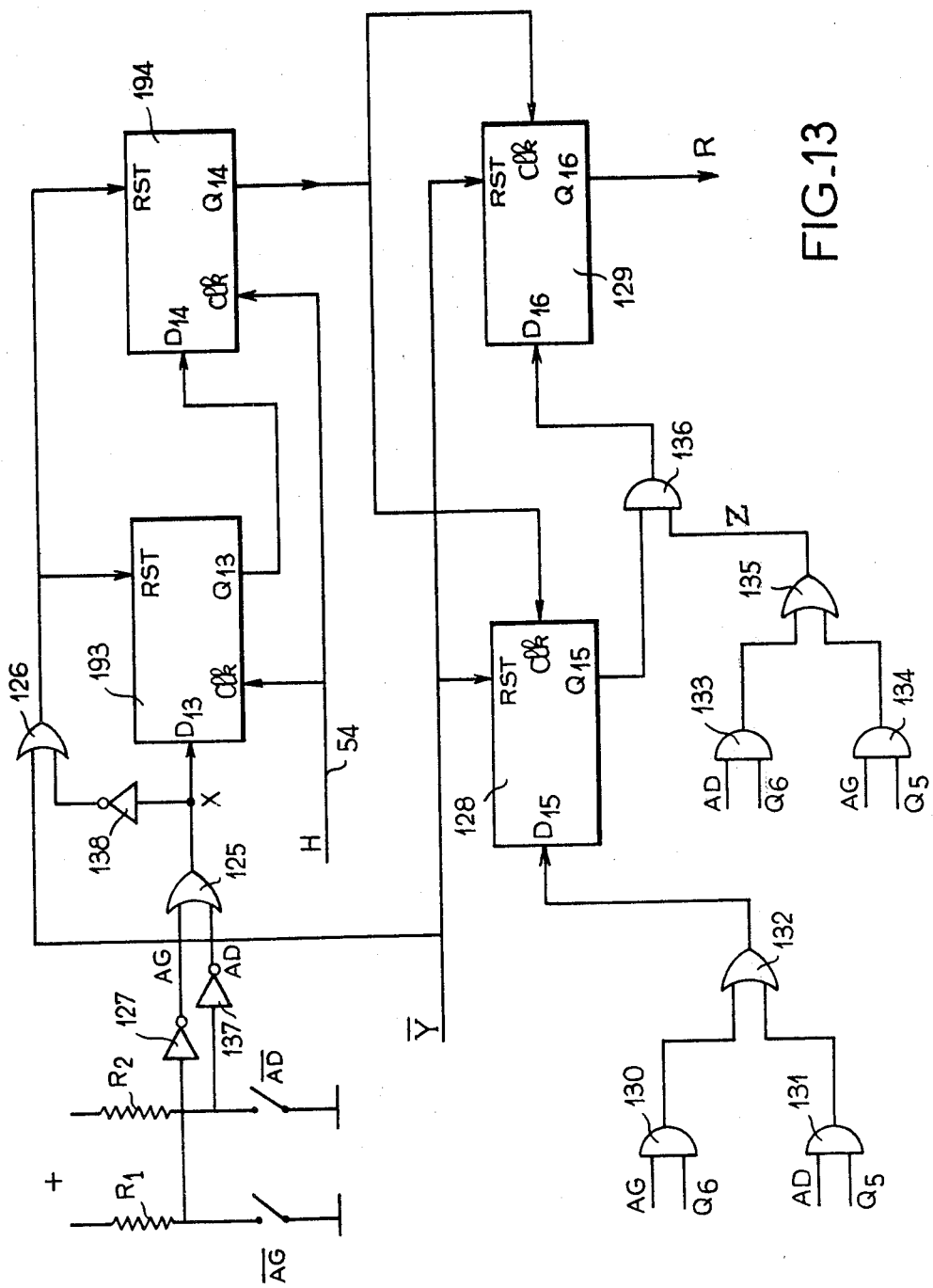
FIG. 13 illustrates a typical form of embodiment of a flasher return circuit operable by reversing the direction of rotation of the steering wheel.

FIG. 13 illustrates a typical form of embodiment of an automatic flasher returning circuit based on the principle of utilizing a pair of pickups (AD) and (AG) of FIG. 12.

In FIG. 13, a pair of switches $(\overline{AD})$ and $(\overline{AG})$ have their movable contact arms grounded directly and their fixed contacts connected via resistors $R_1$ and $R_2$ to the "+supply" terminal of the circuit in order to cause the "one" logic level to appear on said fixed contact when said switches $(\overline{AG})$ and $(\overline{AD})$ are open. The fixed contacts of these switches are connected through logic inverters 127 and 137 respectively to the inputs of an OR gate 125 having its output connected to the input $D_{13}$ of a D-type flip-flop 193 so as to deliver a signal X thereto. The output $Q_{13}$ of this flip-flop is connected to the input $D_{14}$ of a second D-type flip-flop 194. The reset inputs of flip-flops 193 and 194 are connected to the output of an OR gate 126 having its inputs connected on the one hand to the output of OR gate 125 via a logic inverter 138 and on the other hand to the output of circuit 87 of FIG. 9A which generates the signal $\overline{Y}=$-RAZ. The clock inputs of flip-flops 193 and 194 are connected via wire 54 to the clock H of the system. Another pair of D-type flip-flops 128, 129 have their reset inputs connected to the output of circuit 87 of FIG. 9A generating the signal $\overline{Y}$. The clock input of flip-flops 128 and 129 is connected in parallel to output $Q_{14}$ of flip-flop 194. The input $D_{15}$ of flip-flop 128 is connected to the output of an OR gate connected at its two inputs to the corresponding outputs of another pair of AND gates 130, 131 receiving at their inputs the signals AG and $Q_6$ of FIG. 8A, in the case of gate 130, and the signals AD and $Q_5$ of FIG. 8A, in the case of gate 131. The output $Q_{15}$ of flip-flop 128 is connected to the input $D_{16}$ of flip-flop 129 via an AND gate 136 of which the second input is connected to the output of an OR gate so as to receive a signal Z therefrom, said gate 135 having its two inputs connected to the relevant outputs of another pair of AND gates 133 and 134 receiving at their inputs the signals AD and $Q_6$ of FIG. 8A in the case of gate 133, and signals AG and $Q_5$ of FIG. 8A in the case of gate 134. The signals AG and AD are recovered at the outputs of logic inverters 127 and 137 respectively. The output $Q_{16}$ of flip-flop 129 corresponds to wire 78 of FIG. 8A leading to the OR gate 76 having its output connected to the reset inputs of flip-flops 97, 98, 99 and 100 of FIG. 8A. As already explained in the foregoing, both flip-flops 193 and 194 are cascade mounted so that the second flip-flop 194 delivers a signal $Q_{14}$ only if the input signal at AG or AD has been adequate during a complete period or cycle of clock H, this notion having been explained in the foregoing with reference to FIG. 7.

Figure 14:
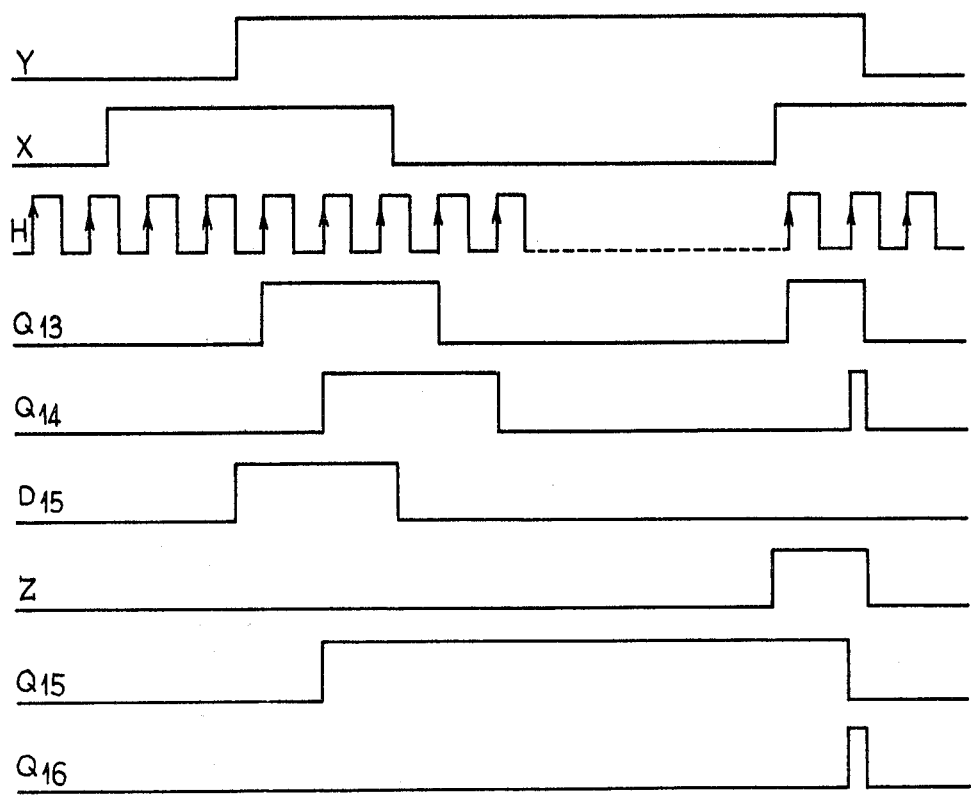
FIG. 14 illustrates the waveform diagrams of the various signals in the circuit of FIG. 13.

Referring now to the waveform diagrams of FIG. 14, line 1 illustrates the signal Y, i.e. the reverse of the reset signal existing when signal $Q_5$ or $Q_6$ of FIG. 8B exists. Line 2 illustrates the signal X existing at input $D_{13}$ of flip-flop 193 when one of the left-hand stop contacts (AG) or right-hand stop-contact (AD) is closed. Line 3 shows the clock signal H. Signal X is to be memorized from the time (assuming that signals X and Y exist simultaneously) X can be memorized on the first ascending front of the clock signals then produced. If signal X still exists, $Q_{13}$ is memorized at the next ascending clock front. Thus, a signal $Q_{14}$ is obtained when signal X (while signal Y still exists) has been clean during a full clock cycle T. This is illustrated in lines 4 and 5 of the waveform diagrams of FIG. 14.

On the other hand, we have:

signal $Q_6=$one, if the flashers operate on the left-hand side;

signal $Q_5=$one, if the flashers operate on the right-hand side.

If the signal generated (AG and $Q_6$ or AD and $Q_5$) corresponds to the closing of the left-hand stop switch while the left-hand directional signal lamps are operating, or to the closing of the right-hand stop switch while the right-hand signal lamps are operating, respectively, the signal $D_{15}$ illustrated in line 6 of the waveform diagrams of FIG. 14 will be memorized on the ascending wavefront of $Q_{14}$ so that the signal available at output $Q_{15}$ of flip-flop 128 will change to state "1", as illustrated in line 8 of FIG. 14. Then, if both signals AD and $Q_6$ or AG and $Q_5$ are present simultaneously, signal Z will exist at one input of AND gate 136. The signal available at input $D_{16}$ of flip-flop 129, which is equal to Z. $Q_{15}$, is memorized on another ascending wavefront of $Q_{14}$. Under these conditions, we have at output $Q_{15}$ of flip-flop 129 a level "1" according to the last line of the waveform diagram of FIG. 14, which level stops the flashing of the signal lamps. We thus have: $Q_5 = Q_6 = 0$. Now, if there is no flashing on either side, flip-flops 128 and 129 are restored to their initial conditions by signal $\overline{Y}$ and the signal available on output $Q_{16}$ of flip-flop 129 drops back to zero.

If desired, a distance-responsive return device may be associated with the above-described means for inhibiting the preceding automatic return means in order to prevent any untimely automatic return during parking manoeuvers. Three exemplary forms of embodiment of this distance-responsive return device adapted to be associated with the above described means will now be described.

Figure 15A:
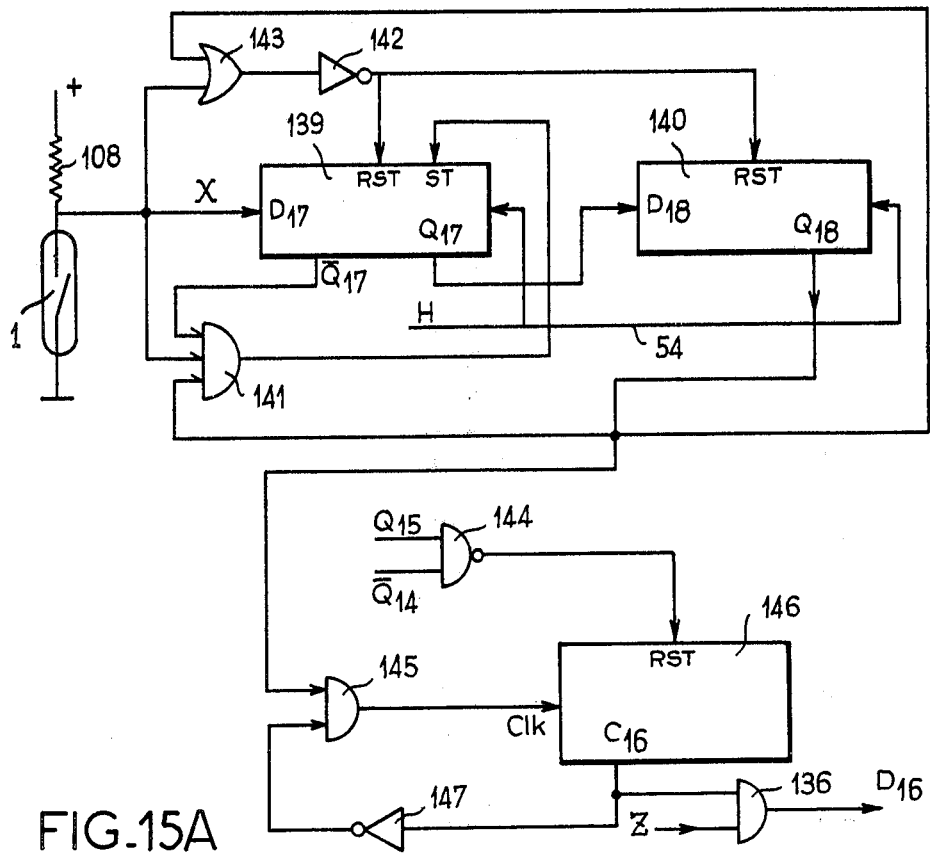
FIG. 15A illustrates a typical form of embodiment of a distance-responsive circuit for returning the flashers.

FIG. 15A illustrates a first form of embodiment so arranged that the vehicle can be allowed to run x meters during the time period elapsing between the opening of a contact, for instance (AD), and the closing of the other contact, for instance (AG), i.e. between the feeding of a signal to the input $D_{15}$ of flip-flop 128 (FIG. 13) and the appearance of a signal Z on the AND gate 136 in the same figure.

According to FIG. 15A, the common point of the movable arm of a REED relay corresponding to switch 1 of FIG. 6 and of resistor 108 in series with said movable arm between ground and the "+supply" terminal transmits a signal X for the input $D_{17}$ of a D-type flip-flop 139 cascade connected to a second flip-flop 140 also of the D-type. The output $Q_{17}$ of the first flip-flop 139 is connected to the input $D_{18}$ of the second flip-flop 140. The input wire transmitting said signal X is also connected as a first input to a logic OR gate 143 followed by a logic inverter 142, on the one hand, and as a first input to a three-input AND logic gate 141, on the other hand. The logic gate 141 is connected via its second input to the complementary output $\overline{Q}_{17}$ of the first flip-flop 139. The output of logic inverter 142 is connected in parallel to the reset inputs of a pair of flip-flops 139, 140 and the clock of the system is also connected in parallel to the clock inputs of the pair of flip-flops 139, 140. The output $Q_{18}$ of the second flip-flop 140 is connected as a second input to the OR logic gate 143, as a third input to the AND logic gate 141 and as a first input to the AND logic gate 145 having its output connected to the normal input of a four-stage divider circuit 146 of the MC 14 520 MOTOROLA type having its output $C_{16}$ connected on the one hand, as a first input, to the AND logic gate already mentioned hereinabove with reference to FIG. 13 and on the other hand as a second input to the AND logic gate 145 via a logic inverter 147. The output of logic and three-input gate 141 in the upper portion of the figure is connected to the reset to "1" or set input of flip-flop 139. The reset input of the lower flip-flop 146 is connected to the output of a NON-AND logic gate 144 having its inputs connected to the output $Q_{15}$ of flip-flop 128 of FIG. 13 and to the complementary output $\overline{Q}_{14}$ of flip-flop 194 of FIG. 13, respectively.

Figure 15B:
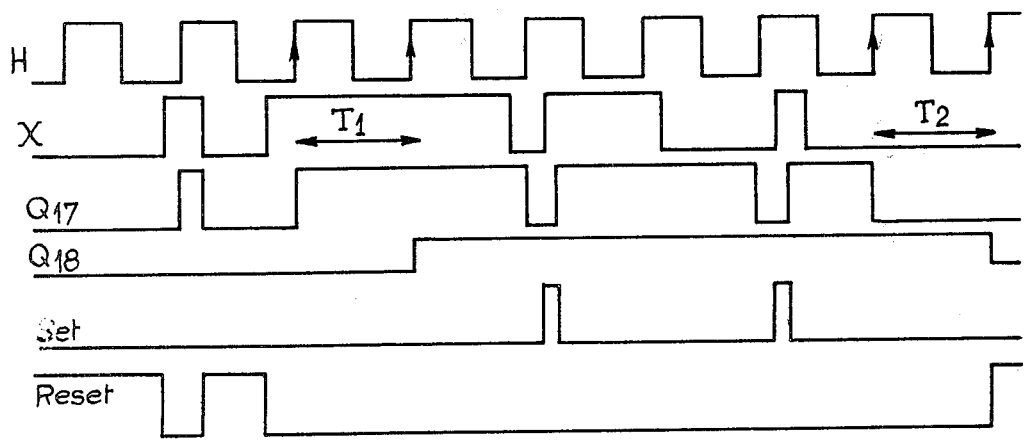
FIG. 15B is the waveform diagrams of the various signals concerning the input circuit.

Considering the waveform diagrams of FIG. 15B, this circuit operates as follows:

The pair of flip-flops 139 and 140 constitutes a twin-flip-flop shift register. In these D-type flip-flops the input signal is transferred to the output on an ascending wavefront of the clock signal. The setting to "1" and the resetting to "0" are obtained at a high level. The input signal X, generally attended by strays, must be clean during at least a complete cycle $T_1$ (line 2) of clock H (line 1), so that the second flip-flop 140 can shift to stage 1. Similarly, the signal X must be clean during a minimum time $T_2 = T_1$ (line 2) so that the second flip-flop 140 can drop back to zero. It is then possible to memorize the information X on the ascending wavefront of $Q_{18}$, i.e. the output signal of the second flip-flop 140. Thus, any information present at the input must last at least a time $T_1$ for becoming operative. The minimum gap between two successive informations should be $T_2$.

In the case illustrated in FIG. 15A, the x meters to be covered by the vehicle correspond for instance to four cycles $T_1$ of REED relay 1 or of signal $Q_{18}$ at the output of flip-flop 140, which is the same. Signals $Q_{14}$ and $Q_{15}$ are released during the closing of the first contact, for instance AD, and signal Z is released when closing the second contact, for example AG. The vehicle must cover at least x meters from the end of the first signal $Q_{14}$ to the release of signal Z.

Figure 16:
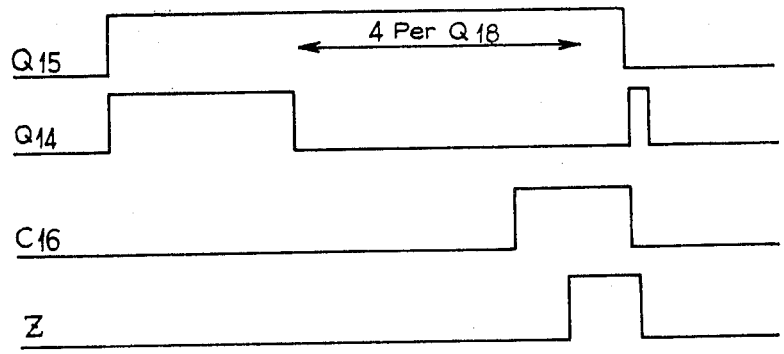
FIG. 16 illustrates the waveform diagrams of the various signals in the circuit of FIG. 15 which permit the distance-responsive return of the flashers.

FIG. 16 illustrates the waveform diagrams of the various signals of that portion of FIG. 15A which permits of returning the flashers as a function of distance.

The input circuit 79 concerning the warning control W, shown in FIG. 6, utilizes the same cascade flip-flop arrangement 139 and 140 as the one illustrated in FIG. 15A.

Figure 17A:
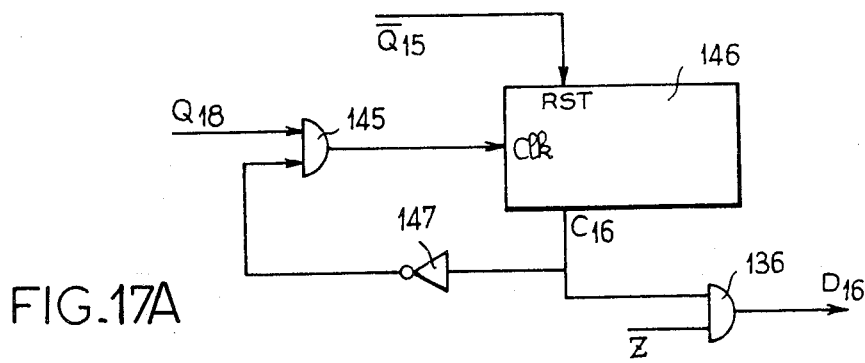
FIG. 17A illustrates a first modification brought to the circuit of FIG. 15A.
Figure 17B:
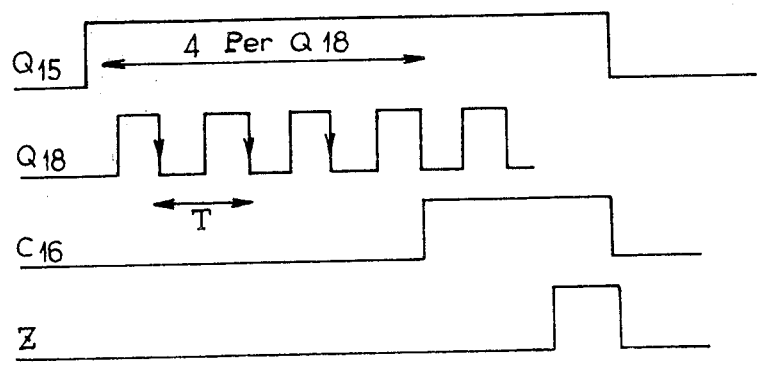
FIG. 17B is the waveform diagram of the corresponding signals.

FIG. 17A illustrates a second form of embodiment allowing the vehicle to cover x meters from the time a contact was actuated by the driver, that is, during the duration of signal $Q_{15}$, before the second contact is closed. The difference with FIG. 15A resides simply in the fact that the AND function logic gate 144 is dispensed with and that, consequently, only the signal $\overline{Q}_{15}$ is received at the reset input of counter 146.

Figure 18A:
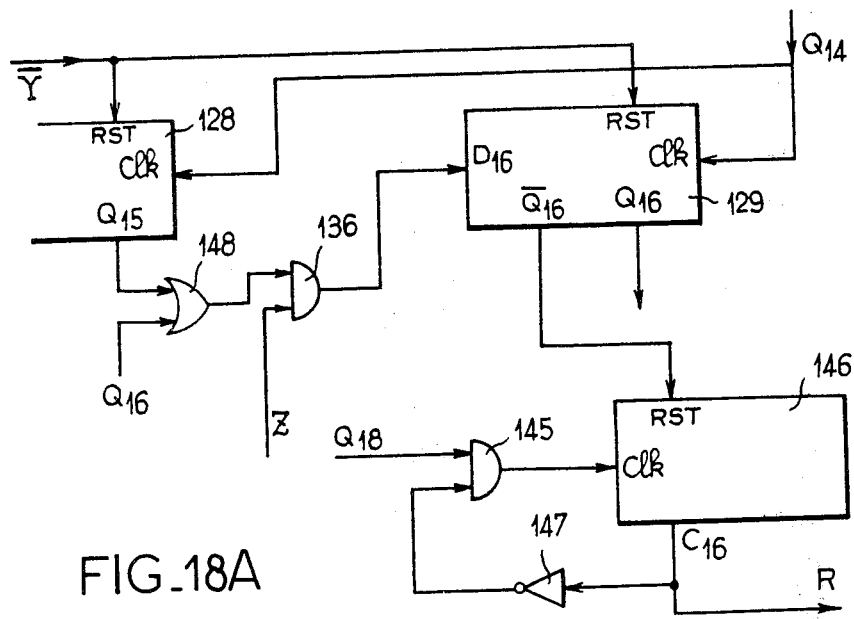
FIG. 18A illustrates another modification brought to the circuit of FIG. 15.
Figure 18B:
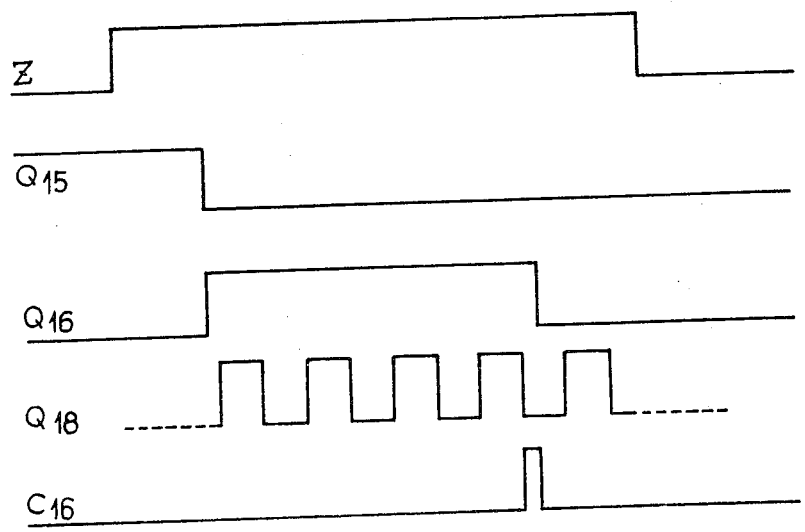
FIG. 18B is the waveform diagram of the corresponding signals.

FIG. 18A shows a third form of embodiment for enabling the vehicle to run another x meters distance from the time the second contact is closed, i.e. after signal Z has been generated, which tantamounts to an extension preceding the automatic stop by a time necessary for running said x meters. Under these conditions, the flip-flop 129 of FIG. 13 should be prevented from operating during this time extension.

For this purpose, another OR logic gate 148 is inserted between the output $Q_{15}$ of flip-flop 128 of FIG. 13 and the AND logic gate 136. The second input of OR logic gate 148 is connected to the output $Q_{16}$ of flip-flop 129 of FIG. 13 and the circuit illustrated, for instance in FIG. 17A, is transferred to the output $Q_{16}$ of flip-flop 129 of FIG. 13. Thus, the output $C_{16}$ of the four stage divider 146 will emit the signal R transmitted beforehand (FIG. 13) directly to the output $Q_{16}$ of said flip-flop 129.

FIG. 19, which is a block diagram of the windshield wiper control unit 202 shown in the center-right portion of FIG. 3, is a magnified representation of unit 202 within the dash-line rectangle. The left-hand side of FIG. 19 shows the transient-action switches 10, 8, 11 which, possibly followed by logic inverters (not shown), are adapted, when they are actuated by the driver of the motor vehicle, to provide the following control actions on the dashboard or instrument panel through the medium of a flip-flop having three transient positions:

low speed windshield wiper operation, for example, a single reciprocation or complete sweeping movement every eight seconds through switch 8;

switching the windshield wiper motor 60, via switch 10, from low-speed to high-speed operation;

to the right: stopping the motor 60 and manual by controlled operation thereof through switch 9, and in the bottom-left position: a simple push member 11 for actuating the windshielding wiper and washer simultaneously with a prolonged operation, during, say, four seconds, of the wiper blades.

Figure 20A:
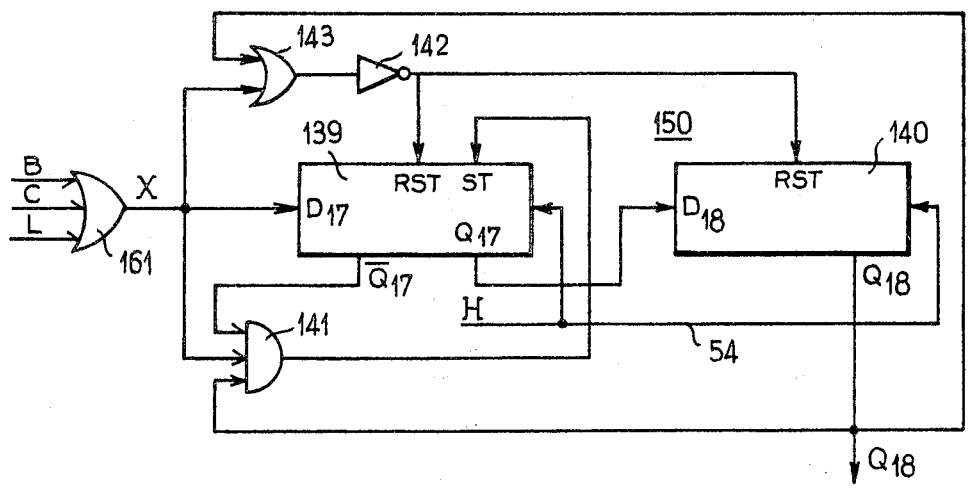
FIG. 20A illustrates a typical form of embodiment of the input circuit of FIG. 19.
Figure 21:
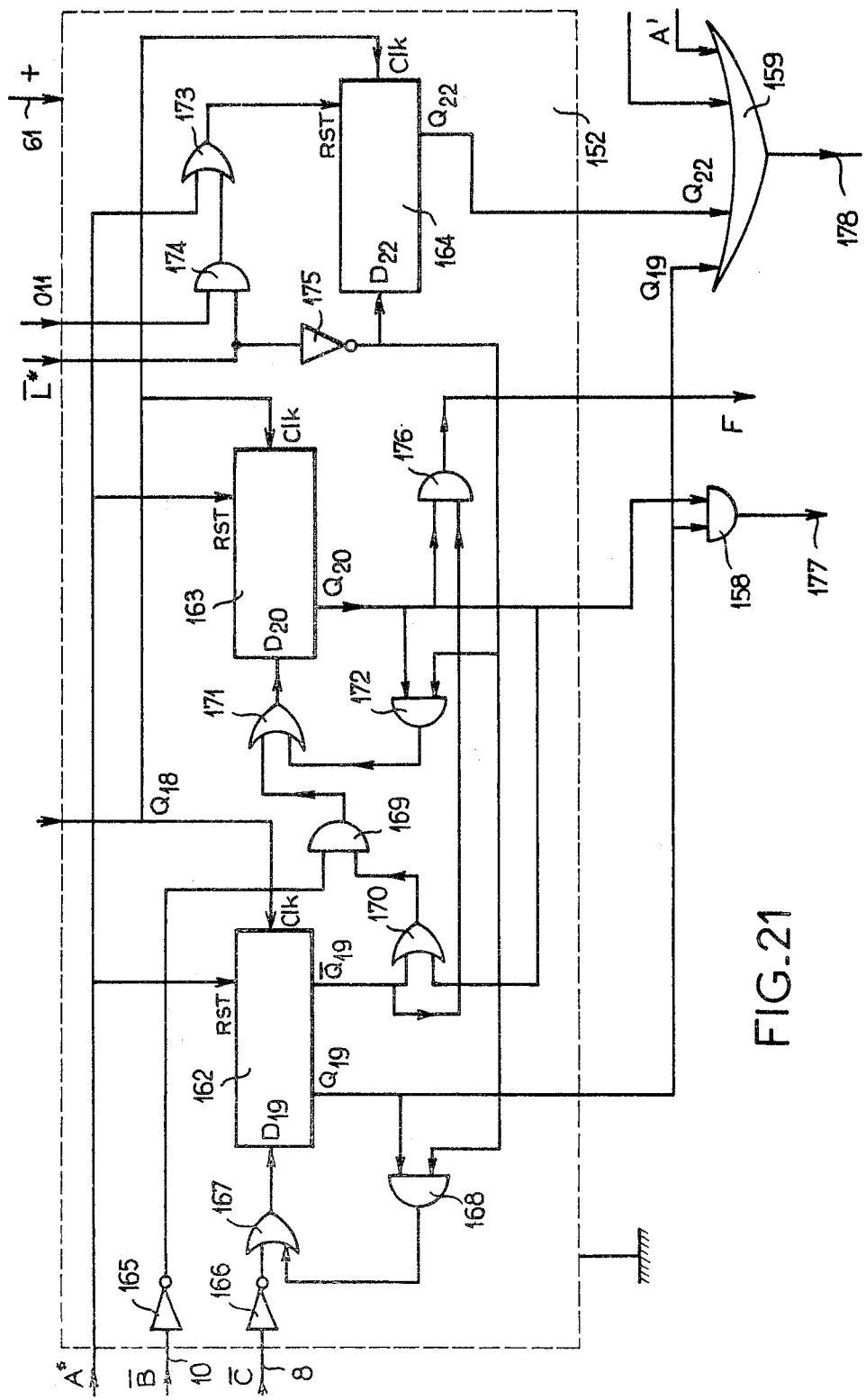
FIG. 21 illustrates a typical form of embodiment of that portion of the circuit of FIG. 19 which relates to the state memorization.

The pair of switches 10 and 8, directly, and the pushbutton 11, via an input interface 151, are connected in parallel as inputs to an input circuit 150 of which a typical form of embodiment is shown in FIG. 20A, on the one hand, and on the other hand to a state memorization circuit 152 of which an exemplary form of embodiment is shown in FIG. 21. The general clock H of the system is connected in parallel via its wire 54 and through a divide-by-three circuit or divider 156 on the one hand to the input circuit 150 and on the other hand to a second divider 157. The output of said input circuit 150 is connected in parallel on the one hand to the state memorization circuit 152, and to the frequency divider 157, and on the other hand to a stop and pre-positioning circuit 153 of which an exemplary form of embodiment is illustrated in FIG. 24A and described hereinafter with reference to this figure. This stop and pre-positioning circuit 153 is connected on the other hand to the stop and single-stroke windshield wiper control 9, to wire 62 at the output of the pre-positioning circuit 69 of FIG. 4 and to wire 64 transmitting the inhibition or strobe signal from the synthesis circuit 55 of FIGS. 3 and 4. The outputs of second divider 157 and stop and pre-positioning circuit 153 are connected as inputs to the state memorization circuit 152. The second divider 157 has two outputs connected in parallel to a pair of inputs of the rate setting circuit 155 illustrated and described hereinafter with reference to FIG. 23A. The outputs of state memorization circuit 152, rate-setting circuit 155 and stop-and-pre-positioning circuit 153 are connected to the various inputs of a logic OR gate 159, and the two outputs of state memorization circuit 152 are connected to the inputs of an AND logic gate 158. The outputs of logic AND gate 158 and OR logic gate 159 are connected in parallel to the inputs of a power interface circuit 154 of which an exemplary form of embodiment is described in detail hereinafter with reference to FIG. 25.

This circuit operates as follows:

Three transient switches $\overline{B}$, $\overline{C}$ and $\overline{L}$, as well as a stop transient switch $\overline{A}$, are provided for controlling the windshield wiper for rate-setting, low speed (PV) and high speed (GV) operation. All the circuits are synchronous.

When a clean signal appears at one input 8, 10 or 11*, the input circuit 150 generates at its output a signal enabling the corresponding state (rate setting) low speed (PV) high speed (GV), time extension in the state memorizing circuit 152, to be memorized. At the same time, this output signal resets the divider 157. The rate setting circuit 155 generates a signal enabling the windshield wiper blades to perform a single reciprocation every eight seconds. The input interface 151 gives the logic high or low level according as switch 11 is actuated or not. The stop and pre-positioning cell 153 permits of resetting the memorizations in circuit 152, a zero positioning of the memories when voltage is applied via wire 62 to the windshield wiper central unit 202 and when there is neither "+coil" nor +ACC via inhibition wire 64. Control 9 also generates via circuit 153 and its output wire 160 connecting this circuit 153 to the OR logic gate a signal enabling the driver to actuate the windshield wiper stroke by stroke.

From the zero or stop position:

the key controlling switch 10 is depressed. We have B=1 and PV (low speed operation) for the windshield wipers. If control key 10 is depressed again, GV (high speed) is obtained. Each time control key 10 is depressed again, a PV to GV (or vice-versa) inversion is obtained;

the driver depresses control key 8. This gives C=1. The windshield wiper blades are actuated at the rate of one reciprocation every eight seconds;

the driver depresses key 9. The state is A=1 and the windshield wipers are stopped, but as long as A=1, PV (low speed) operation is maintained, this condition ceasing when switch 9 is released, the return to "zero" position occuring automatically;

extension of PV operation due to the actuation of key 11 (L=1) is effective only if an operating rate or a stop condition is obtained.

Figure 20B:
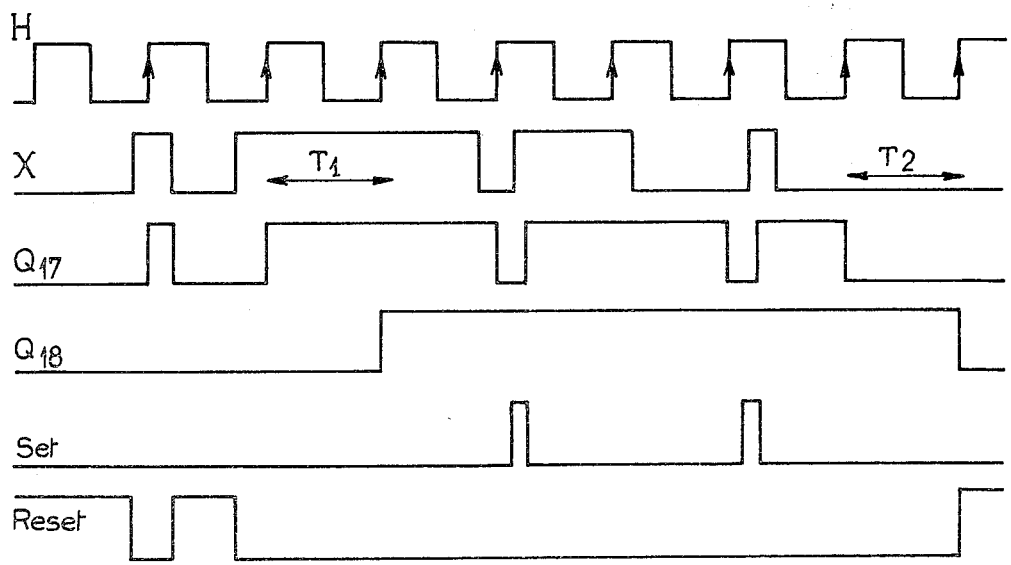
FIG. 20B is the waveform diagram of the main corresponding signals.

FIG. 20A illustrates a typical form of embodiment of the input circuit 150 with a non-synchronized clock, and FIG. 20B depicts the waveform diagrams of the main signals generated during the circuit operation. The essential components and features of this circuit have already been discussed and described in the foregoing in connection with FIG. 15A illustrating a typical form of embodiment of a circuit for the distance-responsive return of directional signal lamps or flashers.

The difference between the two cases shown in these figures is that in the case of FIG. 15A the input signal X can be derived only from REED relay 1 whereas in the case of FIG. 20A three signals B, C and L as already identified in the foregoing may be present at the input via an OR logic gate 161. The waveform diagrams of the main signals are illustrated in FIG. 20B. They are identical with the first six lines of signals shown in FIG. 15B.

The input signal X, generally attended by spurious effects, should be clean during at least a complete cycle $T_1$ of clock H so that the second flip-flop 140 can change to state 1 at its output $Q_{18}$. Similarly, X should be clean during at least $T_2$ so that this second flip-flop 140 drops back to zero. It is then possible to memorize one of the incoming data B, C, L on the ascending front of $Q_{18}$. Thus, the duration of any information present at the input should be least equal to $T_1$ so that due account can be taken thereof. The minimum gap between two successive data should be $T_2$. Now let us consider the state memorization with reference to FIG. 21 corresponding to circuit 152 to FIG. 19. In the form of embodiment illustrated the memorization stage comprises essentially three D-type flip-flops denoted 162, 163 and 164. The input $D_{19}$ of the first flip-flop 162 is connected to the input conductor 8 delivering the signal $\overline{C}$ via a logic inverter 166 and a logic OR gate 167. The reset input RST of flip-flop 162 receives an input signal A* from the stop and pre-positioning circuit 153 of FIG. 19. The clock input Clk of flip-flop 162 is connected to the output $Q_{18}$ of the second flip-flop 140 of the shift register shown in FIG. 20A. The output $Q_{19}$ of flip-flop 162 is connected on the one hand as an input of an AND logic gate 168 having its output connected as a second input to logic OR gate 167, on the other hand in parallel as an input to the AND logic gate 158 and as an input to the OR logic gate 159. These two last mentioned gates have already been identified in FIG. 19. The output $\overline{Q}_{19}$ of flip-flop 162 is connected on the one hand as an input to an OR logic gate 170 and on the other hand as an input to an AND logic gate 176. The output of OR logic gate 170 is connected as a first input to a logic AND gate 169 connected in turn via its second input and a logic inverter 165 to the input conductor 10 delivering the signal $\overline{B}$. The AND logic gate output is connected as a first input to an OR logic gate 171 of which the output is connected to the input $D_{20}$ of the second flip-flop 163 of which the reset inputs RST and clock Clk are connected to the same conductors as the corresponding inputs of the first flip-flop 162. The output $Q_{20}$ of flip-flop 163 is connected on the one hand as a first input to an AND logic gate 172 and on the other hand as a second input to the AND logic gate 176 of which the output delivers a signal F identified in FIG. 19, finally as a second input to AND logic gate 158 of which the output is connected via wire 177 to the power interface 154 of FIG. 19. The output of AND logic gate 172 is connected as a second input to the OR logic gate 171. On the other hand, in the upper right-hand portion of FIG. 21, a pair of conductors identified in the description of FIG. 19 and delivering the signals $\overline{L}^*$ respectively via the input interfaces 151 and 011 from the frequency divider 157 are connected as inputs to a logic AND gate 174 having its output connected as a first input to an OR logic gate 173 receiving at its second input the signal A* from the stop and pre-positioning circuit 153 of FIG. 19, the output of this circuit being connected to the reset input RST of the third flip-flop 164. The conductor delivering the signal $\overline{L}^*$ for logic gate 174 is also connected via a logic inverter 175 on the one hand to input $D_{22}$ of flip-flop 164, on the other hand, as a second input in parallel to logic gates 172 and 168, both of the AND function type. The output of AND logic gate 172 is connected as a second input to OR logic gate 171 and the output of AND logic gate 168 is connected as a second input to OR logic gate 167. The clock input Clk of flip-flop 164 is connected to the output $Q_{18}$ of the shift register of FIG. 20 like the other pair of flip-flop 152 and 163. The output $Q_{22}$ of flip-flop 164 is connected as an input to the OR logic gate 159 already identified in connection with FIG. 19.

The transient controls $\overline{C}$, $\overline{B}$ and $\overline{L}^*$ are memorized in the relevant D-type flip-flops 162, 163 and 164 on a rising front of signal $Q_{18}$, provided that the duration is sufficient for corresponding to a clean signal. The operation of the state memorization circuit may be summarized as follows:

| Outputs | $Q_{19}$ | $Q_{20}$ | 178 | 177 |
|---|---|---|---|---|
| Rate setting | 0 | 1 | 1-0 | 0 |
| Stop | 0 | 0 | 0 | 0 |
| Low speed | 1 | 0 | 1 | 0 |

| Outputs | $Q_{19}$ | $Q_{20}$ | 178 | 177 |
|---|---|---|---|---|
| High speed | 1 | 1 | 1 | 1 |

The logic gate combinations located upstream of the inputs of the three flip-flops 162, 163 and 164 express the following logic equations giving the values of signals available at the respective inputs of each one of said three gates:

$$D_{19} = C + Q_{19} \cdot L^*,$$

$$D_{20} = B(\overline{Q}_{19} + Q_{20}) + Q_{20} L^*$$

$$D_{22} = L^*.$$

Figure 22:
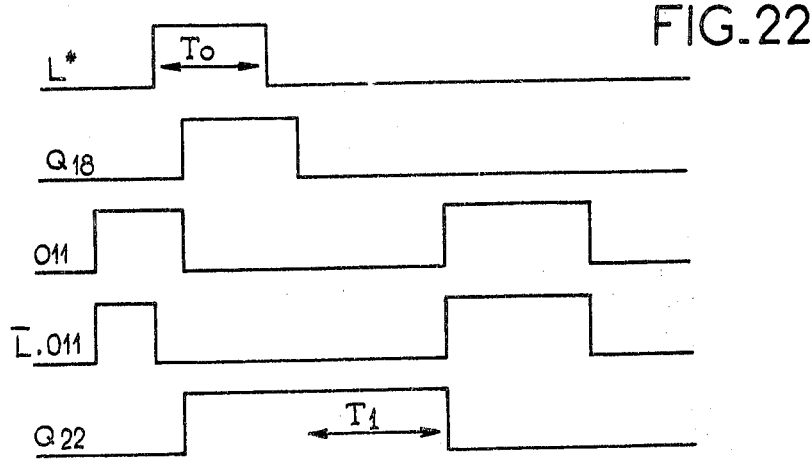
FIG. 22 illustrates the waveform diagrams of the main signals of FIG. 21 in connection with the time extension.

Flip-flop 164, constituting the third flip-flop of the state memorization stage of FIG. 21 and, consequently, an extension flip-flop, permits of memorizing the signal $L^*$ by virtue of signal $Q_{18}$ from the input stage. This flip-flop 164 is reset by signal 011 from divider 157 of FIG. 19, or by the stop signal A* like the other flip-flops 162 and 163. The mode of operation of extension flip-flop 164 will now be explained with the assistance of waveform diagrams of FIG. 22.

The divider 157 is reset when the signal $Q_{18}$ is equal to 1.

The windshield operation at low speed (PV) is obtained with a time extension $T_1$, that is, half-cycle of signal 011, when signal $L^*$ is present.

Figure 23A:
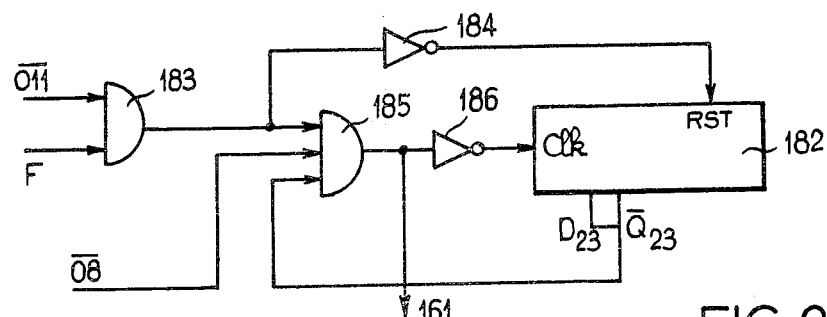
FIG. 23A illustrates a typical form of embodiment of a one-stroke gate useful for setting the rate of operation of the windshield wipers.
Figure 23B:
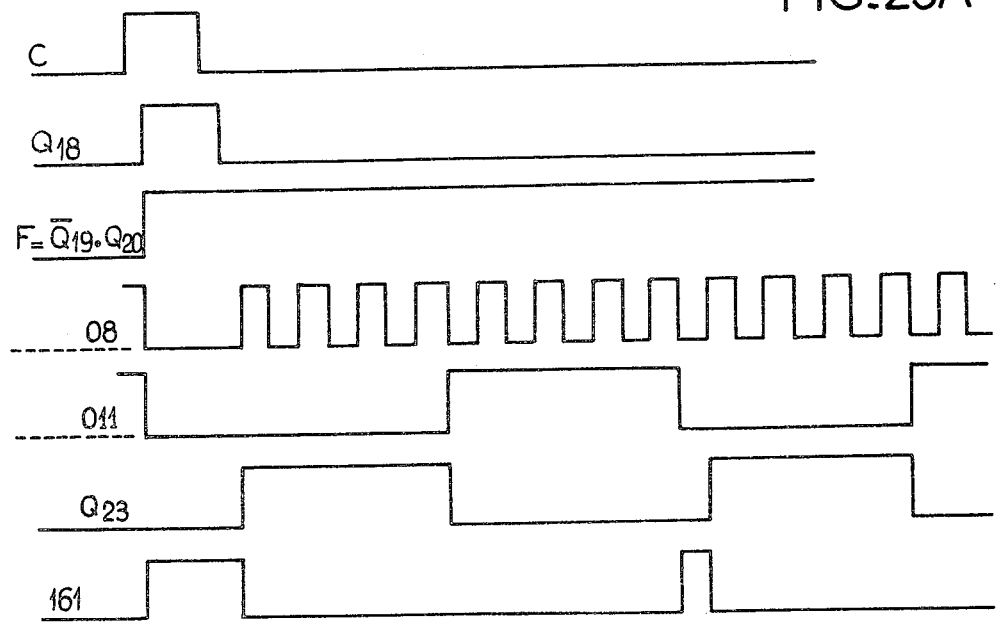
FIG. 23B is the waveform diagram of the main corresponding signals.
Figure 24A:
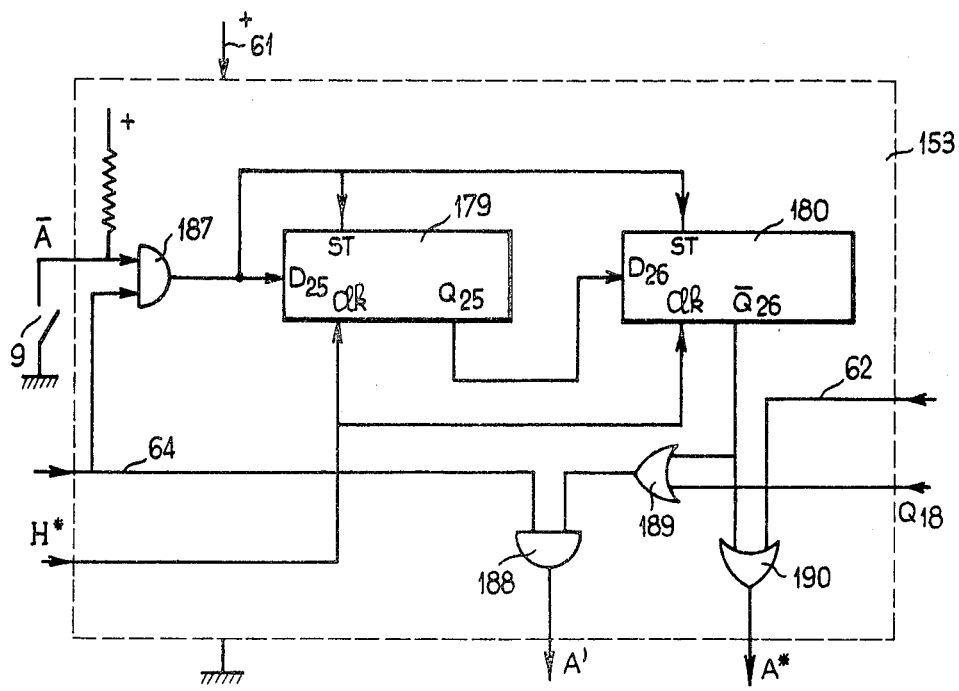
FIG. 24A illustrates a typical embodiment of the portion of FIG. 19 concerning the stop and pre-positioning circuit.

FIG. 23A illustrates a typical form of embodiment of the rate setting circuit 155 of FIG. 19, and FIG. 23B depicts the waveform diagrams of the main signals appearing in the circuit consisting of a one-stroke gate generating a signal at its output 161 which permits a single reciprocation of the windshield wiper every eight seconds.

As shown in FIG. 23A, the signal $\overline{011}$ transmitted by the frequency divider 157 of FIG. 19 and signal F transmitted at one output of the state memorization circuit 152 of FIGS. 19 and 21 are received as input signals by an AND logic gate 183 connected at its output in parallel to one input of a three-input AND logic gate 185, on the one hand, and on the other hand to the reset input RST of a D-type flip-flop 182 via a logic inverter 184. A second input of AND logic gate 185 is connected to the second output of frequency divider 157 of FIG. 19 for receiving therefrom the signal $\overline{08}$, and the output of this AND logic gate is connected on the one hand to the clock input of flip-flop 182 via a logic inverter 186 and on the other hand as a third input to the aforesaid AND logic gate 185.

The waveform diagrams shown in FIG. 23B illustrate the mode of operation of this one-stroke gate. The first line illustrates the signal released at the inputs of FIG. 19 by the actuation of switch 8 generating signal $\overline{C}$. As a result, signal $Q_{18}$ (line 2) at the output of input stage 150 and signal $\overline{F} = \overline{Q}_{19}$. $Q_{20}$ at one output of the state memorization stage 152 of FIGS. 19 and 21 for triggering the operation of the one-stroke gate of FIG. 23B are obtained. Lines 3 and 4 illustrate the two signals 08 and 011 respectively which are delivered by the frequency divider 157 of FIG. 19. Line 6 illustrates the signal issuing from output $Q_{23}$ of flip-flop 182 and line 7 illustrates the signal 161 issuing from the one-stroke gate stage illustrated which causes the windshield wiper blades to perform a single reciprocation.

Figure 24B:
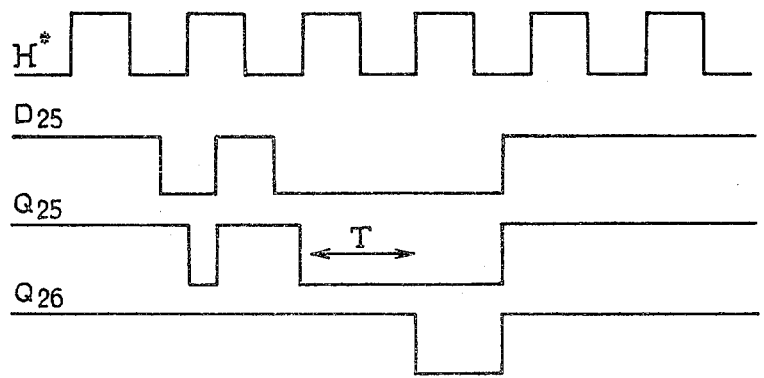
FIG. 24B is the waveform diagrams of the main corresponding signals.

FIG. 24A illustrates a typical form of embodiment of the stop and pre-positioning circuit 153 of FIG. 19, and FIG. 24B depicts the waveform diagrams of the main signals generated in the circuit. According to the form of embodiment shown in FIG. 24A, there is a simplified input circuit with still the pair of D-type flip-flops 179, 180 forming a shift register. The input $D_{25}$ of the first flip-flop 179 is connected to switch 9 delivering the stop signal $\overline{A}$ via an AND logic gate 187 of which the second input is connected to conductor 64 from the synthesis circuit 55 of FIG. 3 so as to receive inhibition orders therefrom. This conductor 64 is also connected to one input of an AND logic gate 188 having its output adapted to generate a signal A' when two high levels are present simultaneously at its inputs. The converted clock signal H* transmitted from the output of divider by three 156 is fed to the Clk clock inputs of flip-flops 179 and 180. The AND logic gate output is still connected to the reset to one input of the same pair of flip-flops 179 and 180. The non-inverting output $Q_{25}$ of the first flip-flop 179 is connected to the input $D_{26}$ of the second flip-flop 180 and the inverting output $\overline{Q_{26}}$ of this second flip-flop 180 is connected in parallel to the first inputs of the pair of OR logic gates 180 and 190. The first OR logic gate 189 is connected via its second input to the output $Q_{18}$ of second flip-flop 140 of the input circuit 150 of FIG. 19 and its output constitutes the second input of AND logic gate 188 generating the output signal A'. The second OR logic gate 190 is connected via its second input to conductor 62 of FIG. 4 which is derived from the pre-positioning circuit. The output of logic gate 190 generates a signal A*' for resetting the state memorization circuits. The waveform diagrams of FIG. 24B illustrate the waveforms, as a function of time, of the following signals: clock signal H*, input signal $D_{25}$ and output signal $Q_{25}$ of first flip-flop 179, and output signal $Q_{26}$ of second flip-flop 180 which exists insofar as signal $Q_{25}$ existed at least during a full clock cycle located between two ascending fronts of this last-mentioned signal.

As already explained, the key 9 or $\overline{A}$ is predominant on all other: $\overline{B}$, $\overline{C}$ and $\overline{L}$.

When the level at the inhibition input 64 is low, we have A*=1 and consequently the state memorization circuits are reset.

When the level at the inhibition input 64 is high, grounding the key 9 or $\overline{A}$ will switch the two outputs A' and A* to one. A single reciprocation of the windshield wiper blades at low speed is produced as long as $\overline{A}$=0. Thus, also in this case the state memorization circuits are reset.

FIG. 25 illustrates a form of embodiment of the power interface 154 of FIG. 19 interposed between the windshield wiper control unit 202 and the energization coils 42 and 43 of the relays controlling the windshield wiper motor 60 either at low speed (PV) or at high speed (GV). With respect to the arrangement already described hereinabove with reference to FIG. 2 and that illustrated in FIG. 19, it will be seen that between the output wires 177 and 178 of the windshield wiper central unit 202, on the one hand, and the energization coils 42 and 43 of said relays, on the other hand, there is inserted in each case a pair of oppositely based transistors 191, 192, the first transistor 191 having its emitter grounded and the second transistor 192 having its collector grounded. The first transistor 191 has its base connected to the input conductor 178 via a resistor. The output is taken at its collector connected on the other hand to the +ACC terminal. This collector is connected to the base of the second transistor 192 connected in series via its emitter to the relay coil 43. In the case of the second pair of transistors, reference numerals 177 and 42 should be substituted for reference numerals 178 and 43, respectively. Transistors 191 are for instance of the BC 237 type and transistors 192, for example, of the BC 327 type in the catalogue of the French Company SESCOSEM.

FIG. 26 illustrates a typical form of embodiment of the input interface for controlling the time extension which is the input circuit 151 of FIG. 19 comprising the series connection between ground and the +ACC terminal of push-button control switch 11 and also the windshield washer 52, which is disposed upstream of the memorization circuit 152 of FIG. 21 receiving the signal $\overline{L^*}$ as well as the input circuit 150. This input interface comprises simply for example a BC 327-type transistor 195 having its collector grounded and its base connected to the circuit point common to push-button 11 and windshield washer 52, and connected via its emitter to the +ALIM (supply) terminal, this emitter being also connected in parallel to the AND logic gate 174 and to the logic inverter 175 of FIG. 21.

FIG. 27 constituting the block diagram of the lighting control unit 203 shown in the lower portion of FIG. 3 illustrates this unit on a larger scale within a dash-line rectangle, through which a number of incoming or outgoing conductors are caused to pass, these conductors being designated by the same reference numerals as in FIGS. 2 and 3; therefore, any further description thereof is deemed unnecessary at this stage of the description. This lighting control unit 203 comprises an input circuit 196, a stage memorization circuit 197 and an inhibition circuit 198.

In the right-hand portion of FIG. 27, the outputs of interfaces 199.1 and 199.2 are connected to coils 44 and 45, respectively, of the relays controlling the dimmed headlights 51, and main-beam headlights 50, respectively. The reset input of memory 197 is connected to the output of an AND logic gate 214 connected in turn at one of its inputs to one output of the inhibition input circuit 198 and at its second input to conductor 62 delivering a pre-positioning voltage useful for energizing the circuit. A conductor 54 connected to the internal clock of the system is connected to one input of input circuit 196 and to one input of inhibition circuit 198. Conductors 64 and 65 transmit the inhibition information and a transient control 12 is provided for controlling the main beam flashing. The diagram of FIG. 27 also comprises the general lighting switch 21 having three sets of primary and secondary contacts designated by the reference numerals 00, 01 and 02 in the figure. A movable primary arm is connected via a wire 16 to the "+AVC" terminal, and the two lower primary contacts are connected on the one hand to the side lamps of the vehicle and, beyond these lamps, to the ground, and on the other hand they transmit the "+LANT" (+side lamp) voltage to computer 20 of FIG. 2. According to the present invention, the movable contact arm of the general lighting switch 21 sweeping the fixed secondary contacts is grounded, so that when this movable arm closes its contact 02, wire 48 is grounded, the output of interface 199.1 is also grounded via a diode 235, and one terminal of interface 199.2 is likewise grounded via a diode 236.

The function of the two conductors 23 (+LANT) and 48 (R) is to decode three positions, namely 00=day, $01$ = town and $02$ = open-road positions of the general lighting switch 21. The signal 23 (+LANT) is reduced to a signal $L_a$ transmitted via wire 65 and consistent with the logic circuit in the synthesis circuit illustrated in FIG. 4, in which transistor 71 acts as an input interface.

In the above-described circuit a pair of input conductors 244 and 245 may be grounded via straps 241 and 242 transmitting signals $e_1$ and $e_2$ respectively. Three logic circuits 247, 248 and 249 permit of calculating the values of S, RC and RP defined as follows, respectively:

$$S = L_a \cdot e_1 + L_a \cdot R \cdot \overline{e_1} \quad (1)$$

$$RC = S(Q_{29} \oplus Ap) + \overline{S} \cdot Ap + L_a R \quad (2)$$

$$RP = L_a \cdot R(Q_{29} \oplus Ap) e_2 \overline{S} \cdot Ap \quad (3)$$

The logic circuit 247 receives the quantities R, $L_a$ and $e_1$ at its inputs connected to conductors 48, 65 and 244, respectively, and calculates equation (1) utilized either directly or in its inverted form in the logic circuits 248 and 249 for calculating the quantities RC and RP, respectively, which, via interfaces 199.1 and 199.2 will supply or not voltage to the coils 44 and 45 of the energizing relays associated with dimmed light filaments 51 and main beam filaments 50 of the headlights. An AND logic gate 222 has one input connected to the output of logic circuit 247 and its second input connected to conductor 64 already defined hereinabove. The logic gate 222 has its output connected on the one hand as an input to the inhibition input circuit 198, and on the other hand, as an input in parallel to logic circuits 248 and 249. The output $Q_{29}$ of memory 197 is connected as an input in parallel to the logic circuits 248 and 249 as well as push-button 12 via a wire 250. This push-button 12 is also connected to one input of interface 199.2 via a diode 237. The logic circuits 248 and 249 are also arranged for receiving the signals R and $L_a$ at suitable inputs. A typical and practical form of embodiment of the logic circuits 247, 248 and 249 will be described presently with reference to FIG. 2. FIG. 27 also shows that one terminal of the energizing relay 44 associated with the dimmed light filaments of the headlights is connected to the +AVC terminal via a conductor 246 provided with a strap 243.

Push-member 7 is a reversing control switch. A change of state is obtained by simply depressing this member 7.

By actuating push-member 12 the driver can either flash the main beams or cause a temporary inversion.

As already mentioned in the foregoing, the circuit means according to the present invention constitute an efficient and satisfactory lighting central unit capable of meeting at will for example the requirements of the Highway Codes of France, Swiss and Italy. Thus, for instance, concerning Italian road regulations, position 00 and 01 of general switch 21 actuating the push-member 12 permits of flashing the dimmed lights 51; in position 02, actuating the same push-member 12 will produce a temporary inversion with respect to the preceding state. If the dimmed lights 51 are ON, grounding the aforesaid push-member 12 will cause the main beam headlights 50 to be ON temporarily, the return to the dimmed light condition occuring when the control is released.

The following Table illustrates the various states obtained by actuating controls 7 and 12.

| Country | Position of main switch 21 | Reversing control $\overline{M}$ - 7 | Transient headlight flashing $\overline{Ap}$ - 12 | Logic levels $e_1$ $e_2$ | Pre-positioning |
|---|---|---|---|---|---|
| France | 00 | | Main beam flash. | 1  1 | |
| | 01 | Inversion C ⇌ L | Temporary inversion C ⇌ L | | L |
| | 02 | Inversion C ⇌ P | Temporary inversion C ⇌ P | | C if L at 01<br>P if C at 01 |
| Switzerland | 00 | | Main beam flash. | 0  1 | |
| | 01 | L permanent | Main beam flash. | | |
| | 02 | Inversion C ⇌ P | Temporary inversion C ⇌ P | | C |
| Italy | 00 | | Dimmed beam flashing | 0  0 | |
| | 01 | L permanent | Dimmed beam flashing | | |
| | 02 | Inversion C ⇌ P | Temporary inversion C ⇌ P | | C |
| France (Regulations) | 00 | | Dimmed beam flashing | 1  0 | |
| | 01 | Inversion C ⇌ L | Temporary inversion L ⇌ C | | L |
| | 02 | Inversion C ⇌ P | Temporary inversion C ⇌ P | | C if L at 01*<br>P if C at 01 |

In the above Table:
C designates the dimmed headlight lamps,
L designates the side or fender lamps,
P designates the main-beam headlight lamps,
*is the reverse change from 02 to 01 giving:
  L if C is at 02,
  C if P is at 02.

To meet French regulations, the pre-positioning is subordinate in position 02 to the preceding state in position 01.

The above Table also calls for the following remarks: for France, the pre-positioning is made with side lamps in position 01; in position 02, the pre-positioning is made for dimmed headlights if side lamps were on in position 01 and for main-beam headlights if dimmed headlights were ON before-hand in position 01. The change from position 02 to position 01 leads to a similar logic progression.

According to this invention, in FIG. 27, the inputs via wires 244 ($e_1$) and 245 ($e_2$) and the relevant straps 241 and 242 permit of adapting the operation of the lighting central unit 203 to the Highway Code regulations of the Country concerned. Straps 241 and 242 permit more particularly of fixing signals $e_1$ and $e_2$ at a zero logic level or "one" level according to requirements.

As already explained in the foregoing, the logic circuit 247 enables the hereinabove defined logic equation (1) to be realized. In this equation we have:

$e_1 = 1$ for France, and $e_1 = 0$ for Switzerland and Italy.

The equality $e_1 = 0$ is obtained by grounding wire 244 by means of strap 241.

In the following cases, memory 197 is reset; in other words, the signal obtained at its output $Q_{29}$ is zero:

When a zero level is obtained in conductor 64, this corresponding to the "parking" or "garage" position of the anti-theft device incorporated in the steering column of the vehicle;

When voltage is fed thereto;

In position 00 of the general conductor 21 for France, and

In positions 01 and 00 for Italy and Switzerland.

According to the wiring diagram concerning the connections between the relay contacts and the lamps equipping the open-road headlights 50 and the dimmed headlights 51, when it is desired to switch the headlights to their main-beam position the pair of relays 44 and 45 of FIG. 27 must be switched on or energized simultaneously, whereas for obtaining the dimmed lights 51 only relay 44 has to be switched on. Therefore, with a non-reversing interface circuit 199.1 and 199.2, the following values are obtained:

with dimmed headlights on: RC=1 RP=0
with main-beam headlights on: RC=1 RP=1.

Now two hypotheses arise:

(a) If the above equation (1) is equal to zero, the headlight flashing control must be actuated once. According to the above Table, we have:

(RC=Ap
(RP=$e_2$ Ap
   (if $e_2=1$, the headlight main-beams are flashed once,
   (if $e_2=0$, the dimmed headlights are flashed once.

(b) If equation (1) is equal to one, we are confronted with two intermediary cases:

($\alpha$) R = 0, we have $\begin{cases} RP = 0 \\ RC = Q_{29}\overline{Ap} + AP \cdot \overline{Q}_{29} = Q_{29} + Ap \end{cases}$ ($\beta$) R = 1, we have $\begin{cases} RP = Q_{29} + Ap \\ RC = 1 \end{cases}$

- in position 02 of the general switch 21, we have $\begin{cases} RC = 1 \\ RP = Q_{29} + Ap. \end{cases}$ The values of RC and RP in the general case are given by equations (2) and (3) hereinabove which are established in logic circuits 248 and 249 respectively of the lighting control unit according to this invention.

The lighting control unit according to this invention is characterized by the following safety features:

Relay 44 is constantly operative; diode 235 connected between the input wire 48 delivering signal R and the output of interface 199.1 keeps the relay 44 working whatever the faulty operation of any electronic component may be, for example in the case of short-circuited or open-circuit transistors. Whatever the failure, we have either the dimmed lights alone energized in case relay 45 is inoperative, or the main-beam headlights energized in case relay 45 is also operative.

in position 00 or 01, the transistors of interface 199.2 of the main-beam headlight relay 45 are not energized except when flashing is desired, via diode 237.

The possibility of having the headlights turned on permanently by day is safely precluded.

Figure 28:
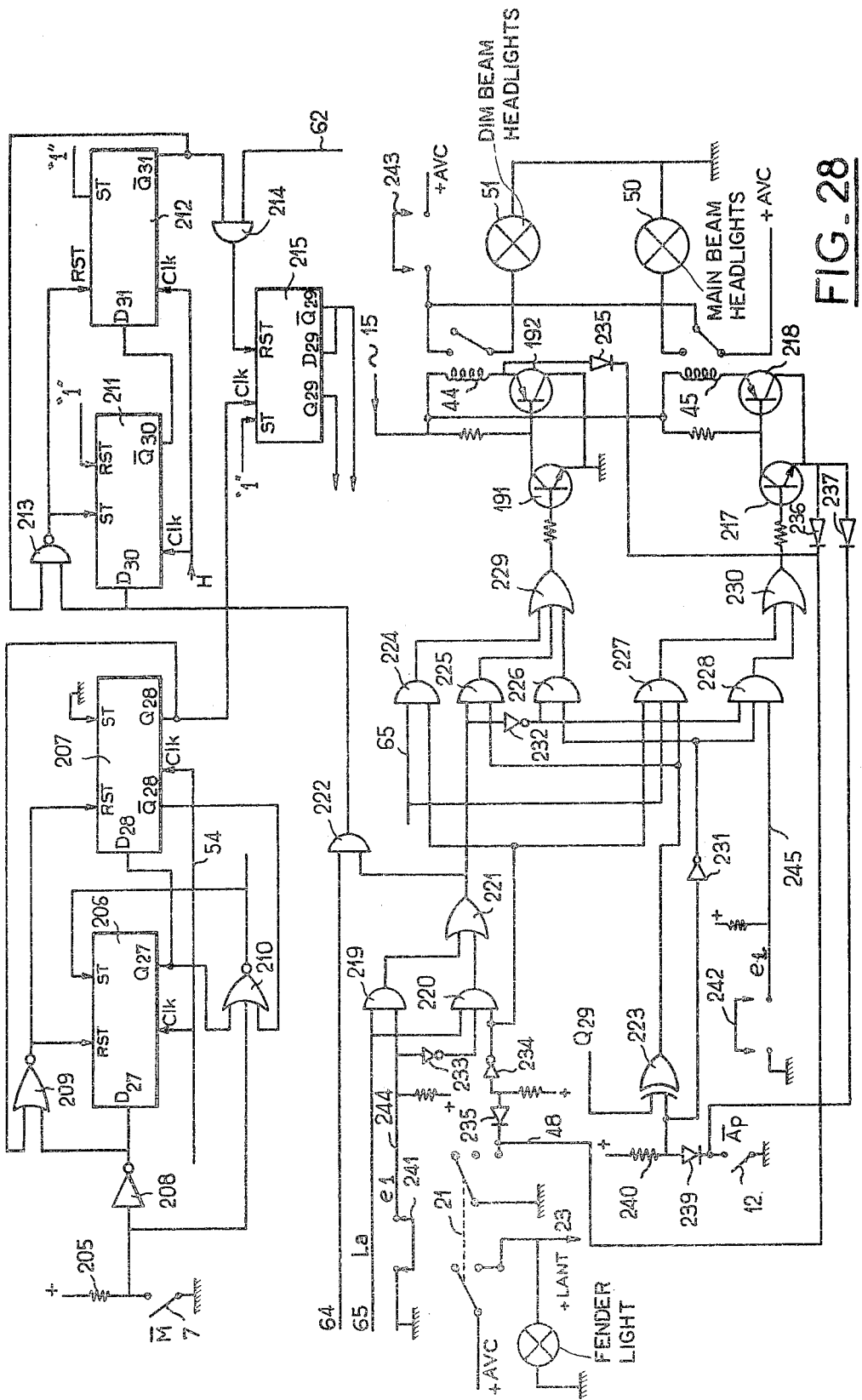
FIG. 28 illustrates in detail a typical form of embodiment of the lighting central unit of FIG. 27.

FIG. 28 illustrates a typical and more detailed form of embodiment of the lighting control unit 203. In the left-hand portion of this unit, the connection point common to the fixed contact of switch 7 and to a resistor 205 in series with said switch between ground and the "+ALIM" (+supply) terminal transmits a signal M for the input $D_{27}$ of a type-D flip-flop 206 cascade connected with another flip-flop 207 also of the D-type. Each flip-flop 206, 207 comprises for example a half-circuit of the aforesaid type 4013. A logic inverter 208 is inserted in the path of signal $\overline{M}$ before the input $D_{27}$ of flip-flop 206. The input of said logic inverter 208 is connected as a first input to a logic gate of the NOR function type, whereas the output of said logic inverter 208 is connected as a first input to another NOR logic gate 209 connected via its output to the reset inputs RST of flip-flops 206 and 207. The output $Q_{27}$ of the first flip-flop 206 is connected to the input $D_{28}$ of the second flip-flop 207, on the one hand, and on the other hand as a second input to the logic NOR gate 210 whereas the third input of NOR logic gate 210 is connected to the reversing output $Q_{28}$ of the second flip-flop 207 and the second output of said logic gate 210 is connected to the reset-to-one input ST of flip-flop 206. The reset-to-one input ST of the second flip-flop 207 is grounded and the output $Q_{28}$ of the same second flip-flop 207 is connected on the one hand as a second input to the NOR logic gate 209 and on the other hand to the clock input Clk of a flip-flop 215 consisting of a half-circuit of type 74 C 74 having its input $D_{29}$ connected internally to the inverter output $\overline{Q}_{29}$ for constituting simply a bistable flip-flop of conventional type of which the state is changed at each ascending pulse received thereby at its clock input Clk.

The two flip-flops 206 and 207 of FIG. 28 correspond to the input circuit 196 of FIG. 27 and the half-circuit 215 corresponds to circuit 197 of FIG. 27 without constituting inasmuch a properly so-called memory. The two remaining flip-flops 211 and 212 of FIG. 28 which consist for example of two half-circuits of type 74 C 74 correspond to the inhibition and pre-positioning circuit 198 of FIG. 27 and constitute an input circuit capable of efficiently suppressing strays. Wire 65 transmitting the inhibition signal from synthesis circuit 55 of FIG. 3 is connected on the one hand to the input $D_{30}$ of the first flip-flop 211 and on the other hand as a first input to a NOR logic gate 213 of which the second input is connected to the inverter output $\overline{Q}_{31}$ of second flip-flop 212 of which the second output is connected on the one hand to the reset to one input ST of flip-flop 211 and on the other hand to the RST input of flip-flop 212. The reset input RST of the first flip-flop 211 is set to potential "one" as well as the set input of second flip-flop 212. The inverter output $\overline{Q}_{30}$ of first flip-flop 211 is connected to input $D_{31}$ of the second flip-flop having its second inverter output $\overline{Q}_{31}$ is also connected to the first input of a logic AND gate having its second input connected to wire 62 from the synthesis circuit of FIGS. 3 and 4 for receiving a pre-positioning signal therefrom. The clock inputs Clk of the four flip-flops 206, 207, 211 and 212 are connected in parallel to the general clock of the system via conductor 54. The output of logic AND gate 214 is connected to the reset input RST of flip-flop 215 having its set input ST at potential "one".

Now a typical form of embodiment of logic circuits 247, 248 and 249 of FIG. 27 will be described in detail.

Two AND logic gates 219 and 220 and one OR logic gate 221 provide together the S function defined by the above equation (1).

The AND-function logic gate 219 is connected via one input to wire 65 from the synthesis circuit 55 illustrated in FIG. 4 and transmitting in the present case the signal $L_a$ as mentioned in the foregoing. The second input of logic gate 219 is connected to a conductor 244 transmitting signal $e_1$ also as mentioned hereinabove. The AND logic gate 220 has three inputs of which two are connected to the same conductors as logic gate 219. However, the second input is connected via a logic inverter 233 to said conductor 244. The third input of logic gate 220 is connected to the secondary terminal corresponding to position 02 of the general lighting switch 21 via a diode 233 and a logic inverter 234. The outputs of logic AND gates 219 and 220 are connected to the inputs of an OR logic gate 221 having its output connected as an input on the one hand to an AND logic gate 222 connected via its second input to conductor 64 from said synthesis circuit 55 and on the other hand to an AND logic gate 225 incorporated in the second logic circuit 248.

This second logic circuit 248 generating the function RC defined by equation (2) given hereinabove comprises three logic AND logic gates 224, 225 and 226 and a single OR logic gate 229. Another logic gate 233 having an exclusive OR function is connected via one of its inputs to the non-reversing output $Q_{29}$ of memory 197 and via its second input to one of the terminals of the flashing push-button 12 generating $\overline{Ap}$ signals through a diode 239. The output of this exclusive OR function logic gate 223 is connected as an input on the one hand to the already mentioned AND logic gate 225 and on the other hand to a three-input AND logic gate 227 incorporated in the third object circuit 249. Reverting now to the second logic circuit 248, the AND-function logic gate 224 is connected via one of its inputs to conductor 65 from the synthesis circuit 55 and via its second input to the secondary terminal corresponding to position 02 of the general lighting switch 21 via a diode 233 and a logic inverter 234.

The first AND logic gate 227 of the third logic circuit 249 already described hereinabove is connected via two inputs thereof to the same conductors as the AND logic gate 224 of second logic circuit 248. The third logic AND gate 226 of circuit 248 is connected on the one hand to the output of OR logic gate 221 via a logic inverter 232 and on the other hand, via its second input, to one of the terminals of the flashing control push-button 12 generating $\overline{Ap}$ signals via a diode 239 and a logic inverter 231. A three-input AND logic gate 228 incorporated to the third logic circuit 249 is connected via two inputs thereof to the same conductors as the third logic AND gate of the second logic circuit 248. The outputs of the three logic AND gates 224, 225 and 226 constituting the second logic circuit 248 are connected in parallel as inputs to an OR logic gate 229 of which the output is connected to the first transistor 191 of interface 199.1.

The second logic AND gate 228 of the third logic circuit 249 is connected via its third input to conductor 245 transmitting signal $e_2$. The outputs of the two AND logic gates 227 and 228 constituting the third logic circuit 249 are connected in parallel as inputs to an OR logic gate 230 having its output connected to the first transistor 217 of interface 199.2.

At the output of the exclusive OR logic gate 223 we have the quantity Q 29 (+) Ap, since it can be seen that this gate 233 is connected via one of its inputs to the non-inverting output Q 29 of the memory 197 and via its second input to the push-member 7 which generates the signal $\overline{Ap}$. Three AND logic gates 224, 225, 226 and one OR logic gate 229 generate the quantity RC as defined by equation (2) hereinabove and two AND logic gates 227, 228 and one OR logic gate 230 generate the quantity RP defined by equation (3) hereinabove.

Referring not to the right-hand portion of FIGS. 27 and 28, as far as the power interfaces 199.1 and 199.2 are concerned, for controlling the dimmed headlights 51 and the main-beam headlights 50 via the corresponding energizing relays 44 and 45, in either case the same circuit as that shown in FIG. 25 is incorporated for controlling each one of the energizing coils of the windshield wiper motor. In the specific case of power interface 199.2 concerning the control of main-beam headlights 50, the circuit point common to the emitter of the first transistor 217 and to the collector of the second transistor 218 is connected via diode 236 and wire 48 already mentioned hereinabove to the secondary terminal 02 of the main or general lighting switch 21 on the one hand, and on the other hand via diode 237 to the closing terminal of push-button 12.

Figure 29:
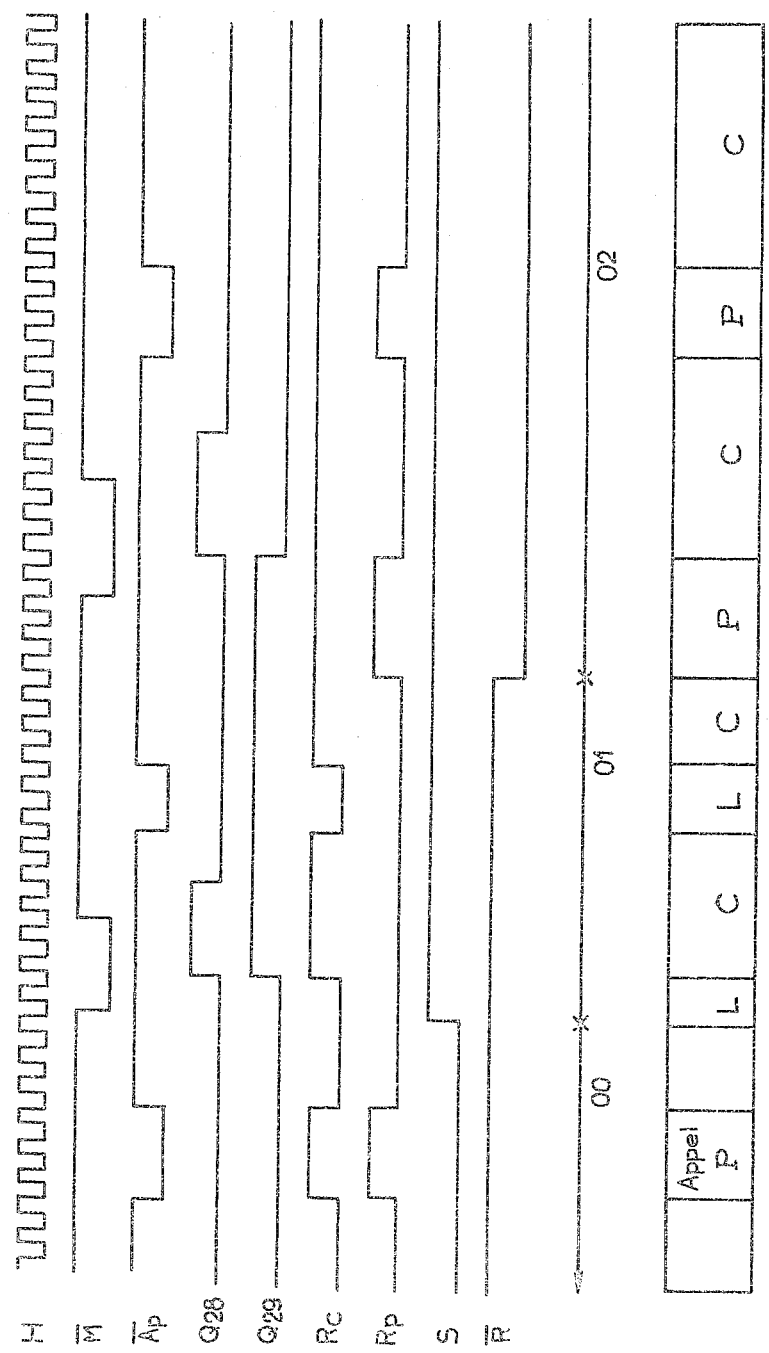
FIG. 29 illustrates the waveform diagrams of the main signals appearing in the circuits of FIG. 28.

FIG. 29 illustrates the waveform diagram of the main signals appearing during the operation of the general lighting control system according to this invention in the case of French Highway Code regulations with $e_1 = e_2 = 1$.

In FIG. 29, the first line illustrates the evolution with time of clock signal H, the second line shows a signal $\overline{M}$ and the third line shows an $\overline{Ap}$ signal, such as they can be generated by the driver actuating the aforesaid push-buttons 7 and 12. Lines 4 and 5 illustrate signals $Q_{28}$ and $Q_{29}$ issuing from input circuit 196 and memory 197, respectively. Lines 6 and 7 illustrate the signals RC and RP, respectively, corresponding to the above equations (2) and (3) and issuing from logic circuits 248 and 249, respectively. Line 8 designates the signal S emerging from logic circuit 247 and corresponding to equation (1), whereas line 9 illustrates the signal $\overline{R}$ transmitted by conductor 48. Line 10 is divided into three successive sections corresponding to the three positions 00, 01 and 02 of main switch 21, whereas beneath this line several rectangles summarize the results concerning the lighting system of the vehicle equipped with the circuit according to the present invention. The abbreviations have the same meanings as in the case of the Table given in the foregoing.

The device according to the instant invention is applicable to all motor vehicles.

In the case of vehicles equipped with double-filament dimmed light/main beam headlights, under no circumstances can the dimmed-light filament and the main beam filament be energized simultaneously, irrespective of the failure having occurred in the electronic circuitry.

In the case of vehicles having separate headlights for the dimmed light beam and the main-beam or open-road light, a strap 243 is provided for interconnecting the main beam filament and the dimmed light filament externally of the headlights, so that any reference to "main beam" implies a reference to "dimmed light".

Finally, the device according to this invention is a high-safety one. In fact, any risk of finding oneself in the "open road" position corresponding to the switching of general lighting switch 21 to position "02", without main beam or dimmed beam is safely precluded.

There is no risk either of having the headlights on by day, except when it is desired to flash them.

Whenever the general lighting switch 21 or the flashing push-button is actuated, a change occurs in the lighting system of the vehicle.

The relay coils 44 and 45 for the main beam and dimmed beam headlights respectively are connected to the "+ACC" terminal and therefore any risk of permanent current consumption is avoided when the ignition key is removed.

When starting the engine of the vehicle, the "+ACC" is cut off as a reminder, and consequently the dimmed beam and main beam headlights are turned off, thus facilitating the starting while keeping the side or fender lamps on.

It will readily occur to those conversant with the art that the three units 201, 202 and 203 could be utilized separately by eliminating conductors 63, 64 and 65 transmitting the inhibition control signals and by adding to each central unit a clock circuit, a pre-positioning cell such as cell 69 of FIG. 4 and a regulation device from the BOB (coil) or +ACC terminals.

On the other hand and for the sake of simplification, the wiring and block diagrams of the flashers, windshield wiper and lighting control units, and of the circuit constituting these control units, are shown in positive logics. It is also obvious that anybody conversant with the art would be capable, starting from the teachings of the present invention, of drawing corresponding wiring diagrams consistent with negative logics. These negative logic diagrams have been omitted to avoid any tedious extension of an already long disclosure. However, it is understood that the corresponding wiring diagrams made according to the negative logics system remain within the scope of the present invention.

What is claimed as new is:

1. A device for controlling components of electrical equipment of a motor vehicle, such as flashing direction indicators, warning lights, side and rear lamps, dimmed headlights, main-beam headlights, windshield wipers and windshield washer, comprising:
respective control switches actuatable by the driver to produce control signals;
control circuit units for processing said control signals from said control switches to develop actuation signals; and
control relays activated by said actuation signals of said control circuit units to supply said components;
wherein said control switches comprise fugitive switches emitting a transient control signal when actuated;
wherein said control circuit units each comprise at least one input shifting circuit for receiving the transient control signal;
said device comprising synthesis means common to all said control circuit units for providing a common supply output to all said control circuit units;
said synthesis means comprising a prepositioning circuit for providing a prepositioning output to all said control circuit units, and clock means for providing a general clock signal to said at least one input shifting circuit for shifting said transient control signal to the output of said input shifting circuit when the duration of the transient control signal is at least one clock period;
each control circuit unit including a memorizing means having an input for receiving said transient control signal provided at the output of said input shifting circuit, and for memorizing said transient control signal, so as to provide said actuation signals for activating said control relays, and having an input connected to said prepositioning circuit to receive a prepositioning pulse corresponding to said prepositioning output when the device is electrically supplied, and including means responsive to receipt of said prepositioning pulse for resetting said memorizing means.

2. A control device according to claim 1, wherein said synthesis means comprises a first input connected to a selectively energizable terminal for supplying an ignition coil of the vehicle, a second input connected to a selectively energizable terminal for supplying accessories of the vehicle, a third input connected to a selectively energizable terminal for supplying said side and rear lamps of the vehicle, a fourth input connected to a selectively energizable terminal for supplying said warning lights, and a plurality of diodes for connecting said first, second, third, and fourth inputs, respectively, to a conductor comprising said common supply output for all said control circuit units, said first and second inputs being connected by means of at least one of said plurality of diodes to a first validation circuit of said control circuit units, and said third and fourth inputs being connected by means of at least one diode to a second validation circuit of a control circuit connected in parallel to said input circuit of the corresponding control circuit unit, said first and second validation circuits being inhibited in the absence of a validation signal applied to said first and second inputs of said synthesis means.

3. A control device according to claim 1, wherein each one of said fugitive switches is arranged to establish, when actuated, a contact with a ground connected to one polarity of an electrical supply.

4. A control device according to claim 1, wherein said prepositioning circuit comprises an integrating circuit.

5. A control device according to claim 1 wherein each input shifting circuit comprises a pair of cascade-mounted flip-flops having clock inputs connected to said clock means.

6. A control device according to claim 1, wherein one of said control circuit units is a flasher control unit, comprising:
a first input circuit having inputs connected to said fugitive control switches corresponding to right-hand and left-hand directional flashing lamps, and an output for providing said transient control signal to the memorizing means;

a second input circuit having inputs connected to one of said fugitive control switches for stopping the flashing operation of said lamps and to an inhibition conductor of said synthesis means, said second input circuit having a validation output;

a stop and prepositioning circuit having a first input for receiving said validation output of said second input circuit, and a second input connected to the prepositioning circuit of said synthesis means, and having an output connected to a reset input of said memorizing means;

said memorizing means having two other inputs respectively connected to said fugitive control switches for the right-hand and left-hand directional flashing lamps, said memorizing means having two outputs;

said flasher control unit further comprising two AND gates, each having an input connected to receive a respective one of the two outputs of said memorizing means for the right-hand and left-hand directional flashing lamps, respectively;

divider means for receiving and frequency-dividing said general clock and having an output connected to another input of each of said AND gates so as to monitor the flashing-time of said flashing lamps; and an output interface having inputs connected to the outputs of said two AND gates and outputs connected to said control relays for switching said right-hand or left-hand directional flashing lamps.

7. A control device according to claim 6, wherein said flasher control unit comprises a third input circuit having an input for receiving a control signal for the warning lights, and having an output, and two OR gates having respective first inputs connected to the aforesaid two outputs of said memorizing means.

8. A control device according to claim 6, comprising automatic return means for the flasher control unit, including:

a detecting device for detecting the steering wheel direction of rotation and comprising two detecting switches, each one responsive to a respective one of said right and left directions of rotation, a first flip-flop having an input and an output for generating a return signal to be applied to said reset input of said memorizing means, a first AND gate having first and second inputs and an output connected to the input of said first flip-flop, a second flip-flop having an output connected to the first input of said first AND gate, two other AND gates of which one has two inputs connected to receive, respectively, the memorized control signal for the right-hand directional flashing lamps from said memorizing means and a detecting signal for the steering wheel right rotation from the corresponding detecting switch, the other AND gate having two inputs connected to receive, respectively, the memorized control signal for the left-hand directional flashing lamps from said memorizing means and a detecting signal of the steering wheel left rotation from the corresponding detecting switch, an OR gate for connecting the outputs of said two other AND gates to said input of said second flip-flip, two further AND gates of which one has its two inputs connected to receive, respectively, the memorized control signal for the right-hand directional flashing lamps from said memorizing means and a detecting signal of the steering wheel left rotation from the corresponding detecting switch, the other of said two further AND gates having its two inputs connected to receive, respectively, the memorized control signal for the left-hand directional flashing lamps from said memorizing means and a detecting signal of the steering wheel right rotation, an OR gate for connecting the outputs of said two further AND gates to said second input of said first AND gate, and a reset signal generating means responsive to the absence of control signals for the directional flashing lamps and the warning lights, and connected to the reset inputs of said first and second flip-flops, for providing a reset signal thereto.

9. A control device according to claim 8, wherein said two detecting switches generate detecting signals corresponding to left and right directions, respectively, of rotation of the steering wheel, said device comprising a further input circuit for shifting said detecting signals corresponding to left and right directions, respectively, of rotation of the steering wheel, said further input circuit having at least one clock input connected to said clock means, so that said detecting signals are provided at the output of said input circuit when occurring during at least one clock period, the output of said further input circuit being connected to the clock input of each of said first and second flip-flops so as to apply said generated detecting signals thereto.

10. A control device according to claim 8, wherein said automatic return means for the flashing control unit include a switch, periodically actuatable as a function of the distance covered by the vehicle to generate output signals, a divider circuit interconnected between said output of said second flip-flop and said input of said first AND gate, and having a reset input connected to receive the output of said second flip-flop, and having an output connected to said input of said first AND gate, said divider circuit having a clock input connected to receive the output signals from the periodically actuatable switch.

11. A control device according to claim 8, wherein said automatic return means for the flashing control unit include a switch, periodically actuatable as a function of the distance covered by the vehicle to generate output signals, a divider circuit connected to said first flip-flop and having an output for emitting a return signal, said output of said divider circuit being connected to said memorizing means, said divider circuit having a reset input connected to the output of said first flip-flop and a clock input connected to receive the output signals from said periodically actuatable switch, said first flip-flop having another output, an OR gate having a first input connected to said another output of said first flip-flop, and said OR gate having a second input connected to the output of said second flip-flop, said OR gate having an output connected to the input of said first AND gate.

12. A control device according to claim 6, further comprising a relay for detecting the current level in the flashing lamps when operated, said relay having a closing contact, two cascade connected flip-flops comprising a first flip-flop having an input and an output and a second flip-flop having an input and an output, an OR gate interconnected between the output of the first flip-flop and the input of the second flip-flop of said two cascade connected flip-flops, said OR gate having another input connected to the input of said first flip-flop, a multistage divider circuit connected to said clock means and having a first dividing output stage, a first AND gate connecting said first dividing stage to the clock inputs of said two cascade connected flip-flops and two successive dividing output stages of higher rank than said first dividing output stage, two other AND gates having respective first inputs connected to said two successive dividing output stages and respective other inputs connected to one of the two outputs of said second flip-flop, an OR gate having inputs to which are connected the two outputs of said two other AND gates and having an output connected to an input of the first AND gate following the first dividing output state, and connected to the inputs of said two other AND gates connected to said output interface, and a reinitialization circuit of said two cascade connected flip-flops and of said driver circuit responsive to the absence of a control signal for the flashing lamps and warning lights, in accordance with closure of said current level detecting relay during the flashing phase of said flashing lamps, for providing a rate setting signal corresponding to the output signal of one of said two successive dividing output stages by the one of said two outputs of said second flip-flop.

13. The control device according to claim 10, wherein said output of said divider circuit is connected, via a logic inverter, to the first input of a second AND gate, said second AND gate being connected between said periodically actuatable switch and the clock input of said divider circuit.

14. The control device according to claim 13, characterized in that said periodically actuatable switch comprises a REED relay in series with a resistor and disposed between ground and a supply terminal, the input circuit comprising a pair of cascade-arranged flip-flops, including a third flip-flop having an output connected to an input of a fourth flip-flop, wherein a junction between the REED relay and said resistor is connected, on the one hand, to the input of the third flip-flop and, on the other hand, to the first input of an OR gate, said OR gate having an output connected, via a logic inverter, to reset inputs of each of the cascade-arranged flip-flops, said junction being connected to a first input of a three-input AND gate, said three-input AND gate having a second input connected to said third flip-flop and an output connected to a set input of said third flip-flop, said cascade-arranged flip-flops having respective clock inputs connected in parallel to a general clock of the device, the output of the fourth flip-flop being connected to said second AND gate and, as a second input, to the OR gate, and, as a third input, to said three-input AND gate.

15. The control device according to claim 12, said device including a periodically actuatable switch and an automatic return circuit connected thereto, said device further comprising a divider circuit connected between the output of the first flip-flop and the first input of said AND gate, said divider circuit having an output connected, on the one hand, as a first input to said AND gate and, on the other hand, via a logic inverter to the first input of a second AND gate, said second AND gate having an output connected to a clock input of said divider circuit, said second input of said AND gate being connected to an input circuit disposed between the periodically actuatable switch and the automatic return circuit.

16. The control device according to claim 15, comprising an OR gate disposed between said first flip-flop and said AND gate, said OR gate having a second input connected to said second flip-flop, said second flip-flop generating a signal provided to said divider circuit.

17. The control device according to claim 1, wherein one of said control circuit units comprises a windshield wiper control unit, and including a windshield wiper motor having energizing coils, said windshield wiper control unit comprising: a first input circuit connected directly to a rate-setting transient switch having an output, to an inverter transient switch, and indirectly to a push-button for extending the period of operation via an input interface, and having an output; a divide-by-three circuit having an input connected to a clock of the device, and having an output connected, on the one hand, to the first input circuit and, on the other hand, to a divider circuit, a stop and pre-positioning circuit having inputs connected to said synthesis means via pre-positioning inputs and inhibiting inputs thereof, and also to a stop and single-stroke operation control switch, and having an output; a state memorization circuit having inputs connected to the rate-setting transient switch, to the inverter transient switch, and to the output of the first input circuit, and having one inverting output and two non-inverting outputs; a rate-setting circuit connected to the one inverting output and the two non-inverting outputs of the state memorization circuit; a first OR gate connected to the two non-inverting outputs of the state memorization circuit, to the output of the rate-setting circuit, and to the output of the stop and pre-positioning circuit; and a power interface connected to the energizing coils of the windshield wiper motor.

18. The control device according to claim 17, comprising a first flip-flop, a first OR gate, a first three-input AND gate, and a three-input OR gate having its inputs connected to the rate-setting circuit, the inverter transient switch, and the output of the input interface, respectively, and having an output connected to said first flip-flop, said OR gate, and said first three-input AND gate.

19. The control device according to claim 18, wherein the state memorization circuit comprises three D-type flip-flops for memorizing rate-setting signals, inversion signals and time-extension signals, said three D-type flip-flops having clock inputs connected in parallel to the output of the first input circuit, reset inputs connected in parallel to output of the stop and pre-positioning circuit, and inputs receiving, respectively, via a logic inverter, signals from said rate-setting circuit, said inverter transient switch, and said push-button, respectively.

20. The control device according to claim 19, wherein one of said three D-type flip-flops is connected to a second AND gate, to said first OR gate, and to a first input of a third AND gate having an output connected to one input of a second OR gate, said second OR gate connecting the logic inverter to the input of said one of said three D-type flip-flops, said one of said three D-type flip-flops having an inverting output connected, on the one hand, to the input of a third OR gate and, on the other hand, to the input of a fourth AND gate, said fourth AND gate having a second input connected to an output of a second of said three D-type flip-flops.

21. The control device according to claim 20, wherein one of said three D-flip-flops has an input connected, via a series connection of a fifth AND gate and a fourth OR gate, to the output of the logic inverter, and has an output connected to said second AND gate, to the third OR gate, to said fourth AND gate, and to a fifth AND gate, said fifth AND gate having an output connected as a second input to said fourth OR gate.

22. The control device according to claim 21, wherein the input logic inverter has an output connected, on the one hand, to the input of a third one of said three D-type flip-flops and, on the other hand, in parallel as a second input to said second AND gate associated with said one of said three D-type flip-flops and, as a second input, to said fifth AND gate associated with a second one of said three D-type flip-flops, said logic inverter having its input connected to a sixth AND gate, said sixth AND gate being connected, via its second input, to one of the outputs of a second divider and, via its output, to a fifth OR gate, said fifth OR gate being connected, via its second input, to one of the outputs of said stop and pre-positioning circuit and, via its output, to the reset input of said third one of said three D-type flip-flops.

23. The control device according to any one of claims 17 or 20, wherein the rate setting circuit comprises a flip-flop having a clock input connected, via a logic inverter, to the output of a second three-input AND gate, said second three-input AND gate having one input connected to the output of a two-input AND gate, said two-input AND gate having inputs connected, via a logic inverter, to the output of said divider, and to the output of said fourth AND gate, constituting the output of said state memorization circuit; wherein the output of said two-input AND gate is further connected, via a further logic inverter, to a reset input of said flip-flop, said flip-flop having an inverting output connected as a second input to said second three-input AND gate, said second three-input AND gate having a second input connected, via an additional logic inverter, to the second output of said divider, the output of said second three-input AND gate comprising the output of said rate-setting circuit.

24. The control device according to claim 17, wherein the stop and pre-positioning circuit comprises a pair of D-type cascade-connected flip-flops, including a first flip-flop and a second flip-flop, said first flip-flop having an inverting output connected to the input of said second flip-flop, the input of the first flip-flop as well as set inputs of the pair of flip-flops being connected in parallel to an output of a two-input AND gate, said two-input AND gate having one input connected to the stop and single-stroke operation control switch and another input connected to an inhibition conductor from said synthesis means; wherein said pair of D-type cascade-connected flip-flops have clock inputs connected in parallel to the output of a frequency divider so as to receive a signal therefrom; wherein the second flip-flop has an inverting output connected as a first input in parallel to two OR gates, said two OR gates including a first OR gate connected, via its second input, to a non-inverting output of the input circuit, a second input of the second OR gate being connected to a conductor transmitting the pre-positioning signal, the output of said second OR gate delivering a signal to the memorization circuit, the output of the first OR gate being connected as an input to a second AND gate, said second AND gate being connected via a second input thereof to a conductor for receiving an inhibition signal, and having an output connected to the OR gate for delivering an output signal thereto.

25. The control device according to claim 20, wherein the interface circuit, for controlling the energizing coils of the windshield wiper motor for providing the two speed of operation of the windshield wiper motor, comprises, on the one hand, a first circuit between the output of the second AND gate and one of said coils, and, on the other hand, a second circuit between the output of said first OR gate and the other coil, said first and second circuits including respective first and second transistors of opposite polarities, the first transistor having an emitter grounded and a collector connected, on the one hand, to an accessories terminal and, on the other hand, to a base of the second transistor, said second transistor having a collector grounded and an emitter in series with a corresponding one of said coils.

26. The control device according to claim 17, wherein the input interface connected to the push-button comprises a transistor having a collector grounded, an emitter connected to a supply terminal, and a base connected to a circuit point common to said push-button and a windshield washer pump, an output of said input interface being connected to the input circuit and the state memorization circuit.

27. The control device according to claim 1, wherein one of said control circuit units comprises a lighting control unit, and including dimmed and main-beam headlight lamps having energizing relays and corresponding coils thereof, said lighting control unit comprising: an input circuit connected to an inverter control switch and having an output; an inhibition and pre-positioning circuit having an output; a state memorization circuit connected to the respective outputs of the input circuit and the inhibition and pre-positioning circuit, and having an output; and an output interface connected indirectly to the output of the state memorization circuit via logic gates, and connected to the coils of the energizing relays for the dimmed and main-beam headlight lamps.

28. The control device according to claim 27, wherein said input circuit comprises a pair of cascade-connected flip-flops including first and second flip-flops, the output of the first flip-flop being connected, on the one hand, to the input of the second flip-flop and, on the other hand, to one input of a three-input NOR gate, said three-input NOR gate having a second input connected to the output of the inverter control switch and a third input connected to an inverting output of the second flip-flop, and wherein said three-input NOR gate has an output connected to a set input of the first flip-flop, another input of the first flip-flop being connected to the output of said control switch via a logic inverter, said logic inverter having an output connected to one input of a two-input NOR gate, said two-input NOR gate having a second input connected to a non-inverting output of the second flip-flop and having an output connected in parallel to reset inputs of each of the first and second flip-flops.

29. The control device according to claim 28, wherein said inhibition and pre-positioning circuit comprises a pair of cascade-connected flip-flops including third and fourth flip-flops, wherein the third flip-flop has an inverting output connected to an input of the fourth flip-flop; wherein a conductor transmitting an inhibition voltage from the synthesis means is connected via an AND gate to an input of the third flip-flop and to one input of a NOR gate, sid NOR gate being connected via a second input thereof to an inverting output of the fourth flip-flop and via an output thereof in parallel to the set inputs of said third and fourth flip-flops.

30. The control device according to claim 29, including a clock connected in parallel to clock inputs of said first, second, third and fourth flip-flops.

31. The control device according to claim 30, wherein said memorization circuit comprises a fifth flip-flop having an input connected to an inverting output thereof, a set input which is at a high potential, a clock input connected to a non-inverting output of the second flip-flop, and a reset input connected to the output of an AND gate, said AND gate having an input connected to an inverting output of the second flip-flop and a second input connected to said conductor transmitting the pre-positioning signal from said synthesis means.

32. The control device according to claim 27, wherein said lighting control unit comprises an input circuit and three logic circuits, a memory connected to the input circuit, an inhibition input circuit connected to said memory, an inverter control push-button connected to said input circuit, a flasher push-button and a general lighting switch having three positions, said flasher push-button and said general lighting switch being connected to at least one of said three logic circuits, and output interfaces connected to said three logic circuits for controlling the energizing coils of the dimmed and main beam headlight lamps, voltage sources connected to said general lighting switch and said output interfaces, respectively, and a conductor for transmitting a validation voltage from said synthesis means, said three logic circuits including a first logic circuit which generates the quantity:

$$S = L_a e_1 + L_a R \overline{e_1}$$

wherein $e_1$ may assume the value zero or one, said first logic circuit being connected via one input thereof to a secondary terminal corresponding to a given one of said three positions of the general lighting switch via a conductor capable of transmitting a corresponding signal $\overline{R}$, said three logic circuits including second and third logic circuits generating quantities RC and RP, respectively, provided via said output interfaces to the energizing coils of said dimmed and main beam headlight lamps, respectively.

33. The control device according to claim 32, wherein the second and third logic circuits generate the quantities:

$$RC = S(Q_{29} \oplus Ap) + \overline{S} \cdot Ap + L_a R$$

$$RP = L_a R(Q_{29} \oplus Ap) + e_2 \overline{S} \cdot Ap$$

respectively, wherein $e_2$ may assume a value zero or one, $Q_{29}$ is the value of the signal at the non-inverting output of said memory, and Ap is the value of the signal generated by depressing the flasher push-button.

34. The control device according to claim 32, wherein the quantity $e_1$ is provided to the first logic circuit by an additional conductor which is grounded by a strap.

35. The control device according to claim 33, wherein the quantity $e_1$ is provided to the third logic circuit by an additional conductor adapted to be grounded by a strap.

36. The control device according to claim 32, wherein the coils of said energizing relays for the dimmed and main-beam headlight lamps have one input connected to a voltage supply terminal, and wherein said general lighting switch includes a movable contact arm and secondary contact studs, said movable contact arm sweeping said secondary contact studs and being grounded.

37. The control device according to claim 32, wherein the output of one of said interfaces controlling the energization of the coil of the energizing relay associated with the dimmed headlight lamps is connected, via a diode, to the secondary terminal of the general lighting switch which corresponds to said given one of said three positions.

38. The control device according to claim 32, wherein an input terminal of one of said interfaces controlling the energization of the coil of said energizing relay associated with the main beam headlight lamps is connected through diodes in parallel, on the one hand, to the secondary terminal of the general lighting switch which corresponds to said given one of said three positions, and, on the other hand, to the flasher push-button.

39. The control device according to claim 32, wherein one of the terminals of each of said relays connected to the dimmed headlight lamps and to the main beam headlight lamps is connected to a supply terminal, and wherein said relays include movable contact arms having back contacts interconnected by a fixed connection.

40. The control device according to claim 34, wherein the first logic circuit comprises: two AND gates, including one AND gate with two inputs and a second AND gate with three inputs, both said AND gates receiving a signal $L_a$ and a quantity $e_1$ via first and second inputs thereof, a third input of the second AND gate being connected through an inverter and a diode to the conductor transmitting the R signal, and an OR gate having two inputs, each connected to a respective one of the outputs of the two AND gates.

41. The control device according to claim 40, wherein the second logic circuit comprises: three two-input AND gates, including a first AND gate having inputs connected for receiving the signals $L_a$ and $\overline{R}$, a second AND gate having inputs connected to the output of an OR gate of the first logic circuit and to the output of an exclusive OR gate, and a third AND gate having one input connected via an inverter to the output of the OR gate of the first logic circuit and a second input connected via a diode and a further OR gate to one of a plurality of terminals of the flasher push-button, said further OR gate having three inputs, each connected to a respective output of the three AND gates.

42. The control device according to claim 41, wherein said exclusive OR gate has one input connected via a diode to one of a plurality of terminals of the flasher push-button, and a second input connected to a non-inverting output of said memory.

43. The control device according to claim 41, wherein the third logic circuit comprises: two three-input AND gates, including a first AND gate having a first input for receiving signal R via a diode and an inverter, a second input for receiving signal $L_a$, and a third input connected to the output of the exclusive OR gate, a second AND gate having a first input connected via an inverter to the output of said OR gate terminating the first logic circuit, a second input connected via an additional diode and an additional inverter to one of the terminals of the flasher push-button, and a third input for receiving the signal $e_1$ from an auxiliary terminal and an additional OR gate, said additional OR gate being connected through its inputs to the outputs of the two AND gates.

* * * * *